(12) United States Patent
Abramson

(10) Patent No.: US 12,487,909 B2
(45) Date of Patent: Dec. 2, 2025

(54) SYSTEMS AND METHODS FOR EFFICIENTLY ROTATING TEST AND PRODUCTION SERVERS

(71) Applicant: Ronald Abramson, New York, NY (US)

(72) Inventor: Ronald Abramson, New York, NY (US)

( * ) Notice: Subject to any disclaimer, the term of this patent is extended or adjusted under 35 U.S.C. 154(b) by 0 days.

(21) Appl. No.: 18/632,096

(22) Filed: Apr. 10, 2024

(65) Prior Publication Data

US 2024/0362152 A1    Oct. 31, 2024

Related U.S. Application Data

(60) Provisional application No. 63/495,297, filed on Apr. 10, 2023.

(51) Int. Cl.
G06F 11/3668    (2025.01)

(52) U.S. Cl.
CPC .............................. G06F 11/3672 (2013.01)

(58) Field of Classification Search
CPC ................................................... G06F 11/3672
USPC ......................................................... 717/124
See application file for complete search history.

(56) References Cited

U.S. PATENT DOCUMENTS

| | | | | |
|---|---|---|---|---|
| 7,970,923 B2 * | 6/2011 | Pedersen et al. | ....... | H04L 67/34 717/173 |
| 11,151,020 B1 * | 10/2021 | Bajoria | ............... | G06F 11/3672 |
| 2008/0120610 A1 * | 5/2008 | Katano et al. | ............ | G06F 8/65 717/168 |
| 2010/0218243 A1 * | 8/2010 | DeHaan et al. | ........ | G06F 21/33 717/176 |
| 2016/0019229 A1 * | 1/2016 | Athale | .................... | H04L 67/02 709/217 |
| 2019/0317757 A1 * | 10/2019 | Jodoin | ...................... | G06F 8/40 |

OTHER PUBLICATIONS

Rescorla, HTTP Over TLS, RFC 2818 (May 2000), Internet Society, Internet Engineering Task Force (IETF), Wilmington, Delaware, U.S.

Dierks, et al., The TLS Protocol, Version 1.0, RFC 2246 (Jan. 1999), Internet Society, Internet Engineering Task Force (IETF), Wilmington, Delaware, U.S.

Telecommunication Standardization Sector of ITU, ITU-T X.509 (Oct. 2019), International Tellecommunication Union, Geneva, Switzerland.

Mockapetris, Domain Names—Concepts and Facilities (Nov. 1987), Internet Society, Internet Engineering Task Force (IETF), Wilmington, Delaware, U.S.

Abramson (compiler), Representative examples (taken Mar. 29-31, 2025) of "server ssl/tls certificates" and Certificate Authority (CA) "root certificates" including server and CA root certificates for the web sites nytimes.com and msnbc.puredocs.us.

* cited by examiner

*Primary Examiner* — Andrew M. Lyons
(74) *Attorney, Agent, or Firm* — Liston Abramson LLP

(57) ABSTRACT

Systems and methods in the field of software development and workflows for networked applications. System would allow rotation of test, staging, and production servers by reassigning their respective addressing, with minimal or no modification to the servers. It would reduce or eliminate uncertainty, additional testing, delays, and downtime as a result of server rotation and maintenance.

13 Claims, 9 Drawing Sheets

FIG. 4

SYSTEMS AND METHODS FOR EFFICIENTLY ROTATING TEST AND PRODUCTION SERVERS

CROSS-REFERENCE TO RELATED APPLICATIONS AND INCORPORATION BY REFERENCE

This application claims the benefit of the filing date of U.S. Provisional Patent Application Ser. No. 63/495,297, filed Apr. 10, 2023, incorporated by reference. It also incorporates by reference the entire contents of a Computer Program Appendix filed in this case (U.S. patent application Ser. No. 18/632,096), comprising a single plain text ASCII file named Appendix.txt, creation date Sep. 26, 2025, size 38054 bytes, incorporating verbatim, under the text headings set forth below, the program listings originally filed in the application file hereof, which are referenced herein (but not reproduced in full herein):
Heading Name
   base_client.conf
   index.html
   index.php
   dbui.css
   manifest.js
   base_server.conf
   tree.txt
   index(2).html
   docCount.php
   repodir.php
   remoteq.php
   mltq.php
   inserter.php
   solrTest.php

BACKGROUND OF THE INVENTION

This disclosure relates to the implementation of applications including management, testing, and workflow for the applications, in particular applications in a networked environment, in which one or more clients use applications provided by one or more servers. More particularly, the disclosure concerns management, testing, and workflow for applications provided in a web environment, in which both the server software and the application-specific client software are provided on the server, and related data managed under the application-level control of the server.

For purposes of this disclosure, "client-server applications" may be regarded as a class of data processing activity in which persons (e.g., users) run "client" software on a machine or process typically local to the person, which obtains one or more services from a "server," as such terms are further addressed herein.

In prior art software development for the "server side" of such a system, it is desirable to be able to test development work in process other than by a process of directly modifying the live production server system. Developers may maintain one or more production servers, one or more test servers, and often staging servers for migrating new versions of the application into full production. The servers in such a deployment may also represent a pipeline of an experimental/developmental implementation, one or more testing implementations that some subset of users will be able to join, a production (or "stable") version, as well as legacy earlier versions that continue to be maintained.

Managing the workflow and transitions among a series or plurality of servers over the spectrum of test through full production presents a number of practical problems.

A server deployment as referenced above reflects (i) production server(s) that provide an application accessed by users over a network, for example over the worldwide web, and (ii) test server(s) contain the latest versions of the application, which may be still under active development and/or in testing. The deployment may also contain (iii) staging server(s), with version(s) of the application that are further developed than the production version, but which may not yet be considered ready for full production, or ready for use by the full user base.

The source code for these servers may be kept in a source code repository such as git (an example of a distributed source code repository). To test, modified code is deployed to (or created on) a test server. When the test server is performing satisfactorily, the code may be deployed to a staging or production server (and likewise, tested staging code may be rotated into production).

Problems that arise in the prior art with this development pattern include (among others) the following:

Code as well as updated data has to be deployed and tested when upgrading either the production or test server.

The test and production servers run at different addresses and by default require different certificates to be installed to support secure user access via https.

Because updates may also change underlying dependencies (for example, links to databases, email, or other subsystems), or the data in the underlying database, etc. facilities (which for example can include data used to test new program changes, which data is not intended to be carried into production), other changes must generally be made to the running test instance and/or production instance to incorporate into production changes that have been made on the test instance. Server rotation thereby imposes undesirable extra steps and inefficiencies of syncing with respect to such dependencies.

Switching of roles between production and mirror instances (and back again) has been practiced for databases. See learn.microsoft.com (database-mirroring-sql-server). However, such practices with regard to databases have not been extended to development and test of an entire application on the mirror instance, in a manner such that the improved and tested application instance and corresponding database can be readily rotated into production. Furthermore, testing may involve developmental changes to the schema of a related database, which causes the situation to differ qualitatively from mere prior art data mirroring, because the test and production databases may become substantially different from each other in both structure and content.

A need therefore exists for structuring a system of test, staging, and production servers to allow rotation of these servers with minimal or no modification to the servers, thereby reducing or eliminating uncertainty, additional testing, delays, and downtime as a result of server rotation and maintenance, as well as simplifying the process of making and testing changes to the servers.

SUMMARY OF THE INVENTION

In one embodiment, test and production servers are operated as virtual machine instances. In one embodiment, the servers may be rotated from testing to production by the simple operation of switching their addressing. As a result of the address rotation, what was the test server appears at the URL that users associate with the production server, and thus the current test server thereby may become the new production server as a result of the address rotation. The test server's machine image (e.g., in the case of Amazon AWS virtual machine instances, an AMI, backed by data snapshots) may also be cloned (either before or following the address rotation), to create a new testing instance, which is made to appear at the same test URL as previously used for testing (or another URL generally used for testing).

To provide ssl/tls that provides https access through such a server rotation, without the need for modification of server code or configurations, a wildcard https certificate, on the machine image that is thus rotated, may be used. The machine image including such a certificate will work as-is through server rotations, so long as the DNS assignments for the images are within the same top-level domain (e.g., test.adomain.com, staging1.adomain.com, production.adomain.com, www.adomain.com, etc.). Therefore, even though it derived from an instance running at a different address, the new production instance can provide services over https without additional configuration for https. The disclosure also includes techniques for rotating servers that rely on other forms of globally unique addressing, such as sending or receiving emails or text messages.

The rotation process can be repeated indefinitely: the new test and production instances can be re-rotated, in a rolling manner. As a result, generations of successive, complete, and working images (e.g., AMIs) are created (and in themselves provide substantial "backup", in addition to other backup measures). This may be done with minimal and in some cases no modification to the code, data, or configurations running on any of the servers. A source code repository can be located in the server machine image itself, and code and configuration files can be edited directly on the test server. Source code management can be incorporated into these servers in a manner that transfers on rotation and the creation of new instances from saved images.

In a multi-level system comprising staging servers as well as test and production servers, the above rotation pattern may be varied, so that server rotations are carried out by levels: test-to-staging rotation(s), and separately, staging-to-production rotation(s). The rotations at the various levels may be carried out non-synchronously (e.g., on different schedules or otherwise different timing for the various rotations).

The techniques described herein can be advantageously used for a wide range of application servers, including data-driven applications. A simple case is where the data in the application is largely or completely static and resides on the web server, for example a document search and review platform for an existing dataset, where the entire document dataset is contained within the root directory of a web application. However, the same rotational approaches for the servers will also work where the database underlying the web application changes continuously during production and may be separate or remote from the web server. In any of such cases, the test database may be kept in synchronization with the production database, on an ongoing basis (or at least synced before rotation), so that rotation carries forward an already synced database from testing to production. Where the database is provided externally from database servers, the database servers associated with the web application servers may be synced in a similar manner and rotated, again by reassigning DNS entries or addressing for the database servers, in a manner similar to the rotation of the corresponding application servers. Alternately, the various versions of the web application may all connect to the same external database server.

Other aspects and advantages of the disclosure will be evident from a review of the accompanying drawings and detailed description, which follow.

BRIEF DESCRIPTION OF DRAWINGS

FIG. 4 shows a display of the main branch of the git project, in GitHub.

DETAILED DESCRIPTION OF THE INVENTION

General Features

Figure 1A:
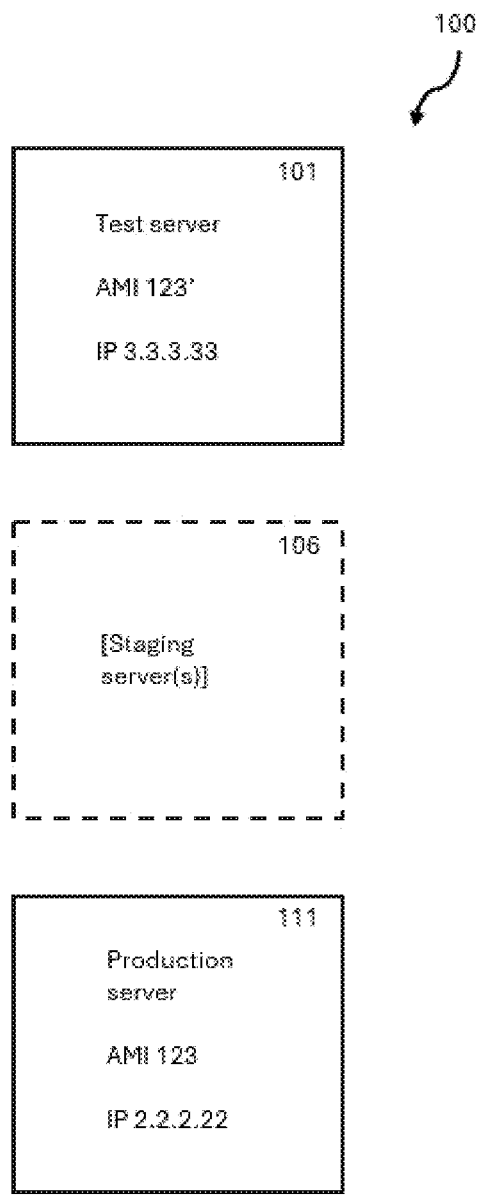
FIG. 1A shows an arrangement of test and production servers and their addresses in a simplified system provided for purposes of illustration.

As shown in FIG. 1A, a system 100 for providing a software application to users through a networked server may comprise one or more test servers (101) and one or more production servers (111), or one or more test servers in combination with one or more staging (106) and one or more production servers. The servers may be associated with a database (not shown in FIG. 1A), which may or may not undergo change during use.

Systems within the scope of this disclosure may include any number of servers, including those at intermediate stages of test and production, as well as different types of test servers, rotated between test, staging, and production.

The servers described herein are preferably but not necessarily associated with virtual machines. The virtual machines may be self-hosted, or hosted by a "cloud" provider, such as Amazon AWS, Akamai/Linode, Microsoft/Azure, etc., or dedicated physical machines, or processes running any kind of machine may be used. For purposes of this disclosure, the term "server" should not be taken to imply anything more than a routine that provides a response to a call or request, and "client" should imply nothing more than a routine that makes a call or request (the nature of the "call/request" and "response" being dependent on the context in which the terms server and client are used; for example, the server in some contexts may provide responses that implement an application. These terms should not in any case be taken necessarily to imply, for example, that the server and client must exist on separate machines. In the case of virtual machines, the term "AMI," though it originated as a reference to an AWS machine image, will be used as a general reference to any type of virtual machine image from any cloud or like provider, or self-provisioned, e.g., with QEMU, KVM, VMware, VirtualBox, etc. (and thus by no means limited to an image on or specific to AWS). The choice of hosting for servers is not material to this disclosure, and no hosting service, such as AWS, should be considered "preferred."

For simplicity the description below begins with the example of rotating a single test and a single production server. Such a rotation may extended by chaining it through an entire group of servers at different levels of test, staging, and production. Preferably, however, as will be more fully developed below, rotations involving servers at different levels of production-readiness, will be performed separately, at the respective successive levels of servers, as a hierarchy of rotations, rather than one concerted rotation through a hierarchy.

The following disclosure will therefore address both the base case of a test-production server rotation, as well as the extended scenario involving staging as well as test and production servers.

For purposes of the following discussion, the terms "test" and "production" may be taken in a relative sense when the context so indicates. Where a multi-level system includes staging as well as test and production servers, servers may be referred to as "test" and "production" in a relative sense, with the server(s) upstream from a given server being regarded as "test" servers (in the relative context), and the servers downstream from it as "production" (also in the relative context). Thus, consistent with such "relative" references, with reference to FIG. 1A, a staging server 106 may be regarded as a "production" server relative to its upstream server (e.g., 101) in a rotation, whereas the same or similar staging server (106) may be regarded as a "test" server when viewed relatively, from a downstream production server, e.g., server 111.

Furthermore, the simplest example addressed herein is for a system in which the server programming may change, as the system is improved or modified, but in which data on the server remains essentially static between server rotations. In such a system, material changes are only introduced at the testing level and not in production. The changes that may be made in such a system at the testing level, referred to herein as "systemspace" changes, include programming changes, the organization/schema of any database encompassing the server data, system configurations, and the like.

More generally, in addition to systemspace changes (such as, e.g., programming or configuration changes), other changes that persistently change the state of a server may occur, and if these occur on a production server, they will have to be reflected in the version of any test database that is rotated into production. Generally, the largest category of such changes will consist of data added and updated during production.

User-induced changes, such as data changes, may occur at the production level (referred to herein as "userspace" changes). Such systems include the entire range of application systems, such as those for sales, inventory, accounting, CRM, MRP, HR, etc. Userspace changes that occur may include transactions, user registrations, logins, and related data. Such changes occur primarily on the production server, but will also occur in staging, and sometimes in testing, if only to test the data entry process itself, or how programs handle new or changed types of data. However, userspace changes that do occur during testing generally will not be committed to the production database (though there may be exceptions in this regard, and userspace changes in a staging system may well be committed to production as well).

The following disclosure will begin with a simple example of where there will only be systemspace changes, and then address instances where there may be both systemspace and userspace changes to the servers, and how the servers in such scenarios may be efficiently and coherently rotated in accordance with the principles set out herein.

Simple Test-Production Rotations

1. Rotation by Address Reassignment a) IP Address Reassignment

The simple example shown in FIG. 1A (above) comprises at least a test server 101 and a production server 111. In one embodiment, the servers are run as virtual machine instances, for example, on Amazon Web Services (AWS), or like provider (Google Cloud, Azure, etc.) (machine environment 100).

Each server has a physical or virtual network address and may have a corresponding domain name designation, e.g., 3.3.3.33 and test.adomain.com for the first (test) server 101, and 2.2.2.22 and production.adomain.com for the second (production) server 111.

Each server is running on a machine image (AMI). Production server 111 is shown as being on machine image AMI123. When provisioned, test server 101 was also on machine image 123. However, since system-level changes, such as changes to the application server source code, are being made on test server 101, the machine image on the test server starts to differ from AMA123 on the production server, and thus test server 101's machine image is denoted as AMI123'.

Figure 1B:
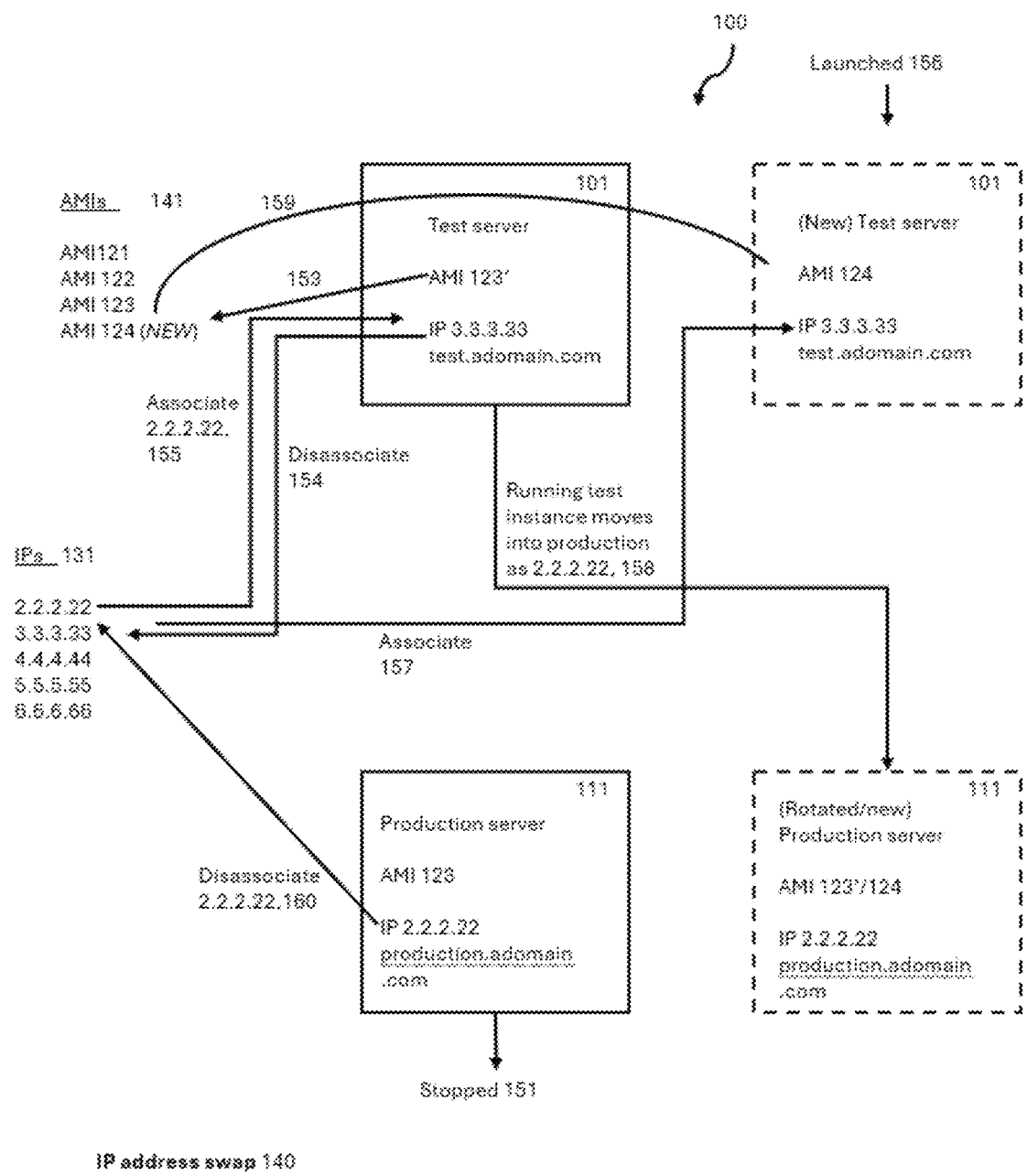
FIG. 1B shows a rotation of test and production servers based on modifying DNS records.

As shown in FIG. 1B, a set of possible IP addresses (for example, but not necessarily, reassignable "Elastic IPs") 131 may be available in virtual machine environment 100.

In one approach, test server 101 and production server 111 may be rotated by reassigning their IP addresses (IP address swap, 140). In step 151, production server 111 is stopped. In step 152, production server 101's (elastic) IP address, 2.2.2.22 is disassociated from the now stopped production server 111. A store 141 of machine images also exists in environment 100. In step 153, test server's machine image, AMI 123', is saved, by creating AMI124 in machine image store 131. In step 154, (elastic) IP address 3.3.3.33 is disassociated (160) from (still running) test server 101, and in step 155 (elastic) IP address 2.2.2.22 is associated with the running instance of test server 101. Since IP address 2.2.2.22 is the address where users go or are directed (e.g., by DNS) to access the production server, test server 101 thereby (158) takes over the role of the production server, and is then designated for purposes of reference as production server 111'. On becoming the production server (111'), that server's machine image is identical to the machine image just saved in store 131 as AMI124, and will be regarded as AMI124. A new test server instance 101' is launched (159) with AMI124. As soon as test server 101' begins undergoing system-level modification, its AMI will be regarded as AMI124'. Note that when a stored AMI is launched, e.g., to rotate in a new test instance, the provisioning of the new instance can be modified, e.g. for more or less processor power, memory, storage, etc., which new revision will run straight into production. Thus, a developer can test and rotate-in more powerful machines, or less expensive ones.

(1) Wildcard Certificates

Preferably, the servers will support https, a widely-adopted standard approach that at the network protocol level serves to protect (encrypt) sensitive content or communications during network transit. The servers may be provisioned (in the AMI) with a common wildcard ssl/tls certificate for adomain.com. Such a certificate will work for test.adomain.com as well as (at least) production.adomain.com, or any other subdomain thereof, or the domain adomain.com itself. The AMI with such a certificate may be rotated from test to production without reconfiguring certificates.

(2) Example State Transitions for Simple Server Rotation

The following table shows the states of server rotation, over successive rotations in accordance with this disclosure:

| State | Testing test.adomain.com 3.3.3.33 ("IPT") | Production www.adomain.com 2.2.2.22 ("IPP") | Archive (not running) |
|---|---|---|---|
| N | App. Server Ver. N + 1 | App. Server Ver. N | App. Server Ver. N (AMI only) |
| N + 1 | App. Server Ver. N + 2 | App. Server Ver. N + 1 | App. Server Ver. N + 1 (AMI only) |
| N + 2 | App. Server Ver. N + 3 | App. Server Ver. N + 2 | App. Server Ver. N + 2 (AMI only) |
| ... | ... | ... | ... |

A series of server rotations may be modeled by a sequence of states of running testing and production server instances, and of archived instance images. For example:

The sequence shown shows that an AMI for App. Server Ver. N already exists in state N. This AMI would have been created in the state that precedes State N (i.e., State N−1). The table shows an initial state N and two rotations, to states N+1 and N+2. The ellipses ( . . . ) represent repetition, for subsequent rotations, where N is incremented for each rotation.

The steps for rotating servers through the above-described states are shown in the table below. Note that the order of some of the actions (for example the order of disassociating and associating IP addresses, archiving AMIs, etc.), other than predicates that must exist for a following step to be performed, is not critical. The use of HTTPS may be achieved in this rotation with a wildcard certificate (as above), for a common top-level domain (e.g., *.adomain.com).

The following table shows the state transition events for any one server rotation in accordance with this disclosure:

b) DNS Reassignment

Figure 1C:
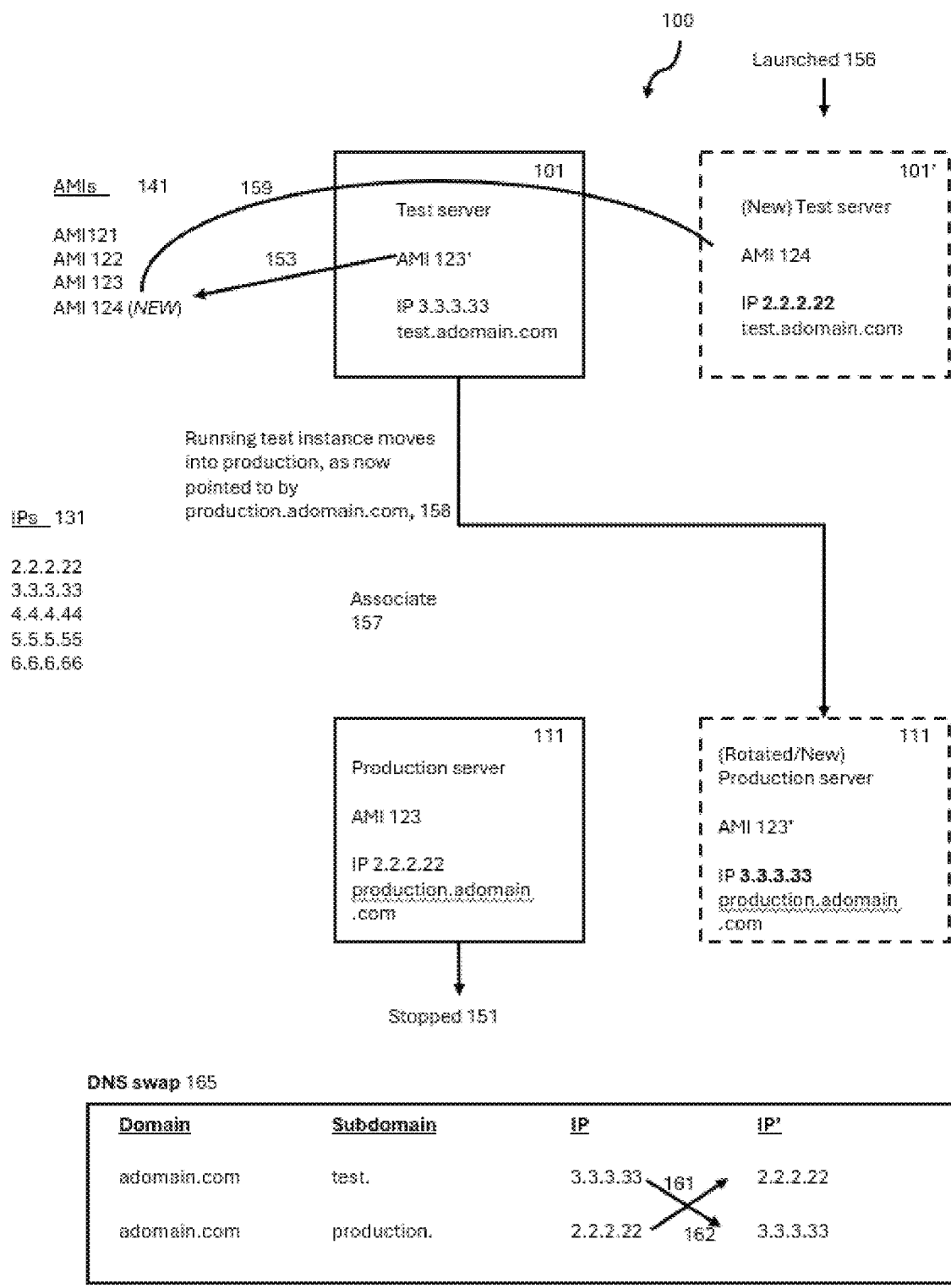
FIG. 1C shows a rotation of test and production servers based on reassociating IP addresses with machine instances.

In an alternate approach, shown in FIG. 1C, test server 101 and production server 111 may be rotated by altering their DNS records (165).

Thus, the DNS record for test.adomain.com, through, for example, A or AAAA records, can be reassigned (161) from 3.3.3.33 to 2.2.2.22 (or corresponding IPv6 address or other network address), and the DNS record for production.adomain.com can be reassigned (162), from 2.2.2.22 to, e.g., 3.3.3.33. The testing machine 101, still at 3.3.3.33, is then accessible by users as the production machine at production.adomain.com (and thereafter regarded as production machine 111). An image of the machine at 3.3.3.33 (e.g., an AMI image) can be created, before or after the DNS change, and used to launch a new virtual machine at 2.2.2.22 (or any other network address to which a test URL is or will be mapped), to serve as a new test machine 101. This rotation is substantially to the same effect as the rotation shown in FIG. 1B, except that the DNS entries for the test and production servers swap IP addresses with every rotation.

Under the first alternative (FIG. 1B), the machines in the rotation can keep using the same IP addresses, with no necessary changes to DNS, and thus the first alternative may be preferable for that reason. On the other hand, depending on the cloud provider, it may be operationally more convenient to swap the DNS subdomain entries instead.

In any of the above-described embodiments, developers can then edit directly on the test instance (e.g., via VS Code running an ssh plugin, or via ssh directly with a local editor), or alternatively push code to the test instance from a cloned repository. On rotation, the test server instance simply becomes the production instance. Any data or configurations that are local to the server, which were changed on the test server, thereby automatically migrate as well into production as a result of the address rotation. The test server's machine image (AMI) may be cloned upon the rotation, to create a new testing instance.

A directory server may also be utilized to provide a network facility to identify running servers.

2. Variable Provisioning of Instances

Note that when a stored AMI is launched, e.g., to rotate in a new test instance, the provisioning of the new instance can be modified, e.g. for more or less processor power, memory, storage, etc., which new provisioning will rotate into pro-

| Step | Action |
|---|---|
| 101 | Archive the AMI from the current testing server (which in State N would be instance ver. N + 1) |
| 102 | Disassociate IPP from the current production server [N] |
| 103 | Disassociate IPT from the current testing server [N + 1]] |
| 104 | Associate IPP with the instance that just was the testing server [N + 1] (becomes the new production server [now N + 1]), and stop the prior production instance [N]. May also edit testing status in, e.g., manifest.js, to say testing = false. |
| 105 | Launch new instance based on AMI Ver. N + 1 saved in step 101, associate it with IPT, and update its versioning (to N + 2) in the AMI name, and optionally internally. Becomes the new testing server, e.g., [N + 2], testing = true) |

Following the foregoing, test the new servers, refresh/probeinfo.js (see below) if necessary, and refresh the main site page so that local caches are flushed and the proper versioning and testing status appears in the browser.

duction. Thus, a developer can test, and rotate in/deploy, more powerful machines, or less costly ones, without necessarily modifying anything within the machine image being launched or rotated.

3. Self-Discovery of Test/Staging/Production Status

A server can self-discover, e.g., probe for, whether it is running as a test, staging, or production instance. In the case where servers are rotated by the method disclosed herein of reassigning IP addresses, each server can check its own IP address (e.g., via the "dig" command (e.g., dig +short myip.opendns.com @resolver1.opendns.com), among others) and determine, based on the IP address so detected (and a stored list of the IP addresses assigned to the respective servers), whether it is a production, staging, or production server. It can then trigger other configuration action based the determination, with no administrative edits to the server required for rotation. Likewise, if the IP address was assigned via DNS to a test, staging, or production URL, the running instance can trace its own public IP address through the DNS server, and determine the corresponding URL and check it against a stored list of assigned server URs, to determine if the server in question is for testing, staging, or production (regardless of the fact that in such an instance the IP addresses themselves are not fixed).

Alternately, any instance can query a server provided for identification purposes to determine its status as a test, staging, or production server. Each instance may be configured to act as such a server, to provide identification on a peer-to-peer basis. The server response may reflect a latest update time to reflect whether the identity information is fresh, with fallback to a designated authoritative server or to direct discovery via dig commands, DNS queries, and the like. The identity information may be accompanied by a map of all current instances, their roles, addresses, last update time, and/or URLs, sent by default or on demand.

Therefore, any running instance as disclosed herein can probe from within the instance, without any manual steps required, whether it is a test, staging, or production instance. This capability may be provided through a script or program that runs on demand prior to action that depends on the server's status, e.g., the "dig" example above. Further, since an instance may be rotated into staging or production entirely by external reassignment of addressing, the probe capability may be incorporated into a cronjob or other scheduler. The result of the probe may be persisted locally in a file, environment variable, or other non-transitory, machine-readable record. The examples herein assume the probe status is recorded in a JavaScript or other file named, e.g., probeinfo.js, in (e.g.) the Document Root (or any other) directory, or an environment variable (e.g., $probeinfo or %probeinfo%). Optionally, such a file or data entry may also be manually created or edited, though such manual intervention should not be necessary, given the availability of suitable status probe mechanisms based on discovery of an instance's own IP address or DNS assignment at a specified name server. Since instances may be stopped and their AMI saved for reuse, preferably the instance will also perform discovery operations as described herein, upon launch, boot and/or application initialization, as the role of the saved instance may change on redeployment.

All of the rotational steps described herein, including without limitation steps of creating and saving machine images, launching server instances from specified images, starting and stopping instances, assigning and reassigning IP addresses to instances, modifying DNS entries in the environment's provided DNS (e.g., Amazon Route 53 DNS), may be programmatically scripted and executed, in any sequence or combination. Those of skill in the art will be familiar with, for example, the AWS facility for such scripting, documented at docs.aws.amazon.com (cli section), which has parallels at the other major cloud services providers. The AWS CLI provides commands that enable fine-grained control of all AWS operations, such as change-resource-record-sets (alter DNS settings), associate-elastic-ip, ec2 run-instances, etc. Scripts in the AWS CLI may be stored on, and/or run, for example, directly on virtual server instances, and kept in stored machine images or any other storage provided in the environment (such as Amazon S3 and other storage facilities). Any server rotation describe herein may be saved and automated in this manner.

4. System Updates

System updates (e.g., updates to operating system and/or applications), including security updates, may be issued at any time. Preferably, these are applied as issued to the testing instance (which would later be rotated into production), and more preferably, applied as issued (without necessarily waiting for server rotation) to all active or running server instances, at least after testing the updates on the testing and/or staging versions to check for undesired and/or unanticipated side-effects of the update.

Example of Simple Server Implementation: Document Review/Search

Servers 101 and 111 may generally be any type of networked application server. In one embodiment, the server may be, for example, a search engine for search and retrieval against an indexed repository of content documents in various formats, running on a virtual machine instance, such as an AWS Linux 2 instance. Such an example is shown in FIG. 2.

Figure 2:
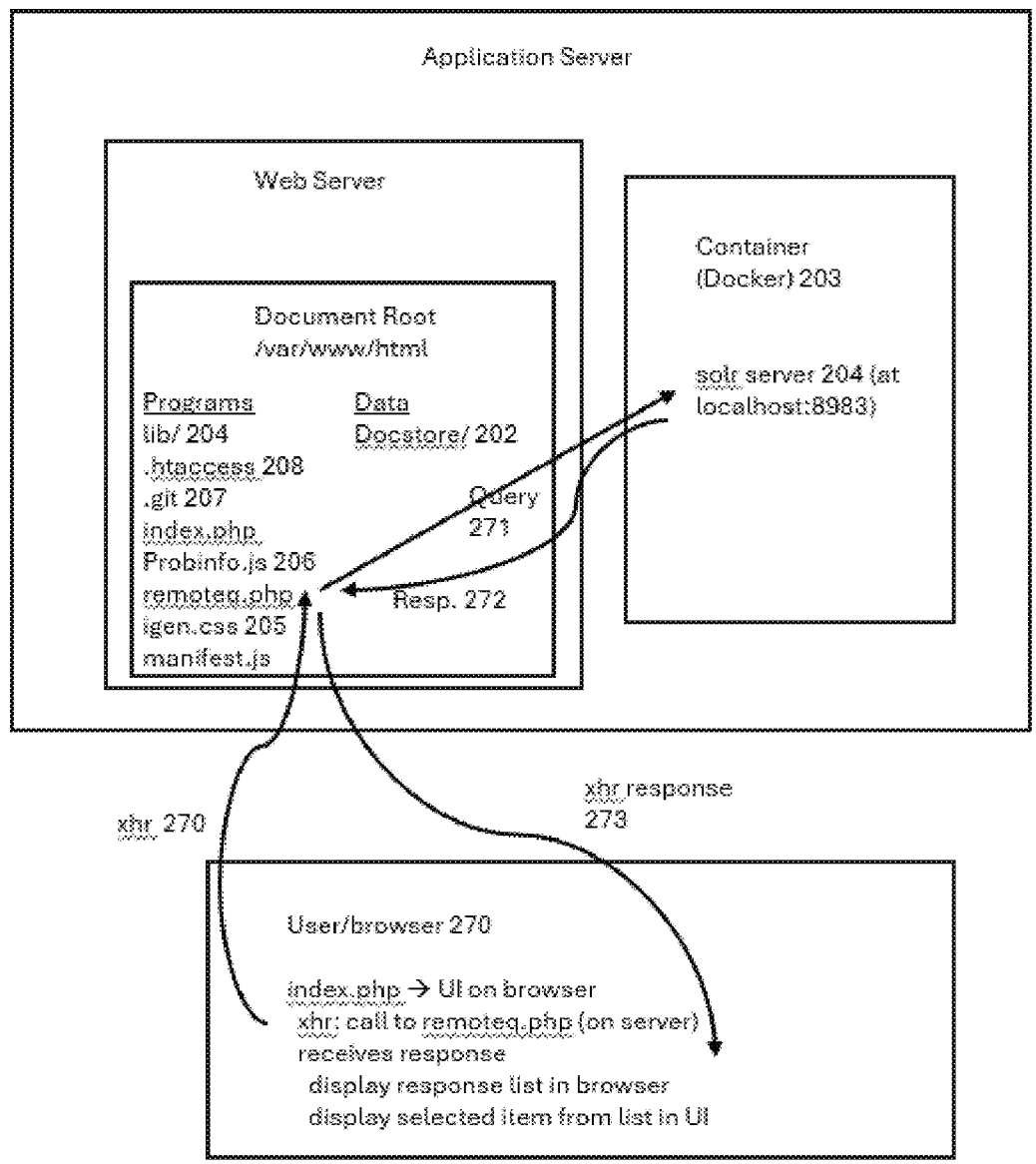
FIG. 2 shows the architecture of one example of a server that can be rotated in accordance with the present disclosure.

As shown in FIG. 2, the server instance may comprise a web server, such as Apache httpd (201), a document data store, for example under the web server's document root directly, such as /var/www/html/docstore/ (202), a container such as Docker (203), an indexing server, such as Apache solr (204) (or alternatively, a server such as Elasticsearch), running under Docker, accessible on the instance at localhost:8983, JavaScript libraries (204), such as jQuery libraries for advanced user interface functionality, as well as style sheets (205), configuration files such as probeinfo.js (206), and a git instance (207). For purposes hereof, a server such as the foregoing solr server (and/or its container), may be regarded as a "supporting server." The supporting server may or may not be on the same machine as the web server it supports, and may be dedicated or shared with other web servers of the same or different test-staging-production sequence.

In the example of an embodiment such as a document search engine, the documents (PDFs and other formats) reside on the server. An indexing server (such as solr) is run in a container (such as Docker) on the web server, providing a search service for the index on the web server machine's localhost (e.g., localhost:8983). The web application serves as a front end, providing a user interface (through browser JavaScript) for searching the solr index. The web application receives and assembles the search parameters and formats a request (via XMLHttp request (xhr)) to an HTTP service (e.g., a script such as remoteq.php that runs on the same web server), which in turn submits 271 a corresponding query to solr (on localhost:8983) and relays 272 the results through the web server, (273) to the user's browser (270). The web server also retrieves the responsive documents for display in a window of the browser UI (274).

Figure 3A:
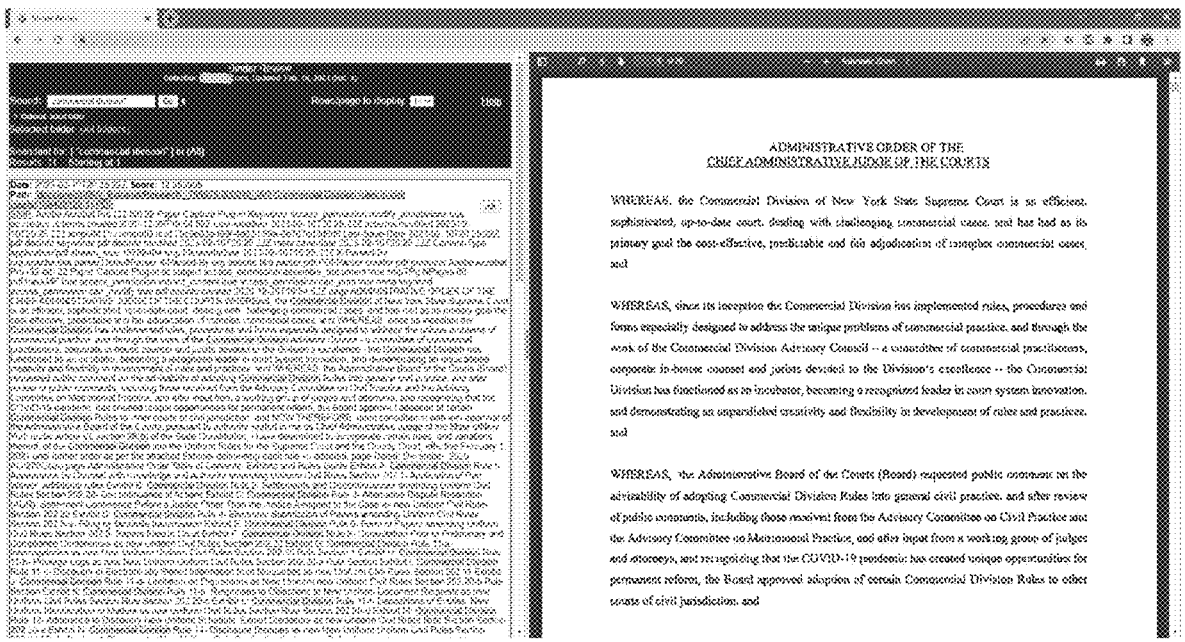
FIG. 3A shows the results of searching documents in repository, for a specified string.

FIG. 3A is an example view showing the above-referenced web application in operation, reflecting the results of searching the documents in docstore/(which is a repository of documents relating to a civil lawsuit, for the string "commercial division."

Note that clicking on "Optional: select folder" in this figure opens a directory tree control. The directory selected from the tree will replace "(All folders)" and then limit the query to the selected folder. The example here shows the query "commercial division" run against "All folders", which resulted in eleven responsive documents, with the results as to the first such document displayed in the figure.

Figure 3B:
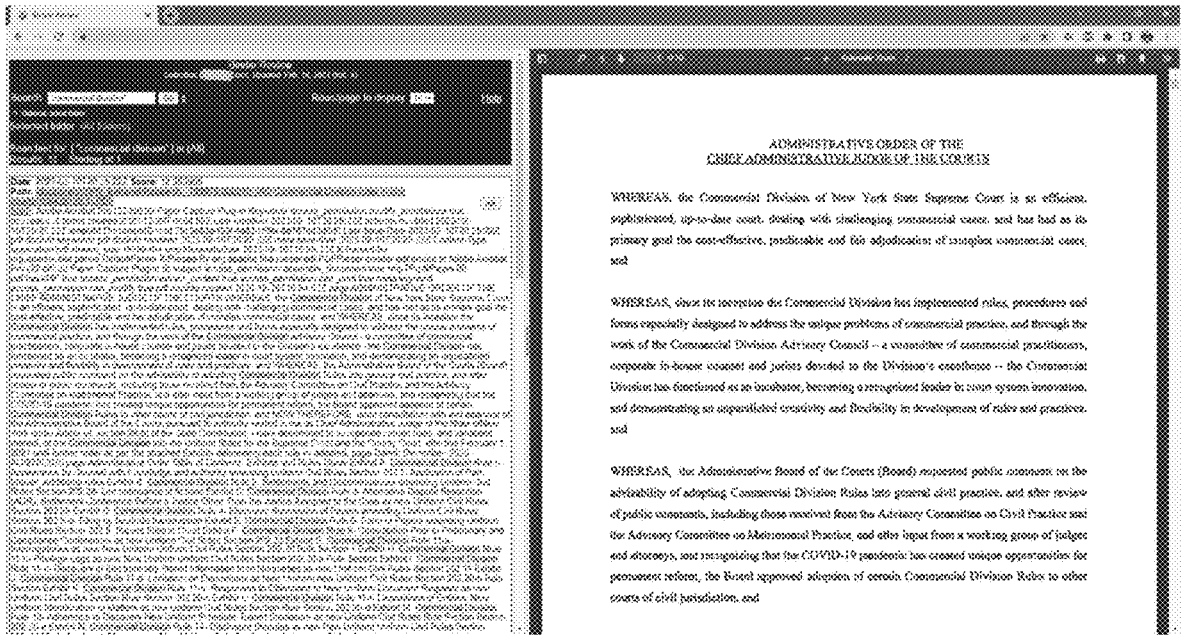
FIG. 3B is the same as FIG. 3A, except that the displayed versioning reflects a "testing" version.

FIG. 3B is a screenshot of a testing version of the application whose display is shown in FIG. 3A.

The only discernable difference (which is optional, and need not be implemented) is that the test version shows "(Testing)" in its header, and is at a different URL (redacted). (How this is done, i.e., how the test version determines that it is a test instance, will be addressed later in the following discussion.)

The web server in the foregoing embodiment is secured by ssl/tls (by virtue of the wildcard certificate), as reflected in server configuration files 211. The use of a wildcard certificate means that the test and production servers can be set up at different DNS A or AAAA records of the same domain, and the same certificate will work for both, with no modifications. The document root directory on the web server in that embodiment is secured by HTTP basic authentication (.htaccess 208, htpasswd 212) (though other types of user authentication can also be used). The solr service on the default port 8983 is firewalled so as to be accessible only from localhost and specified IPs.

In addition, access to ancillary services, such as the solr server 204 (on port 8983 by default), may be limited, for example, through AWS Security Group settings, to access from localhost, and from a very limited set of specified IP addresses.

The architecture of a simple server that works in accordance with the above-described embodiment uses a web server such as Apache httpd 201 to provide a front end for presenting a user interface for an underlying indexing server, such as solr server 204. The solr server runs in a Docker container (203) and responds as a service to web queries submitted over localhost:8983. The web server provides a UI for a user to make queries, which it forwards on the back end to retrieve results from the solr server. The web server lists the results in the provided UI, and provides further UI elements to display the corresponding document when the user clicks on the corresponding entry in the result list in the UI.

Figure 4:
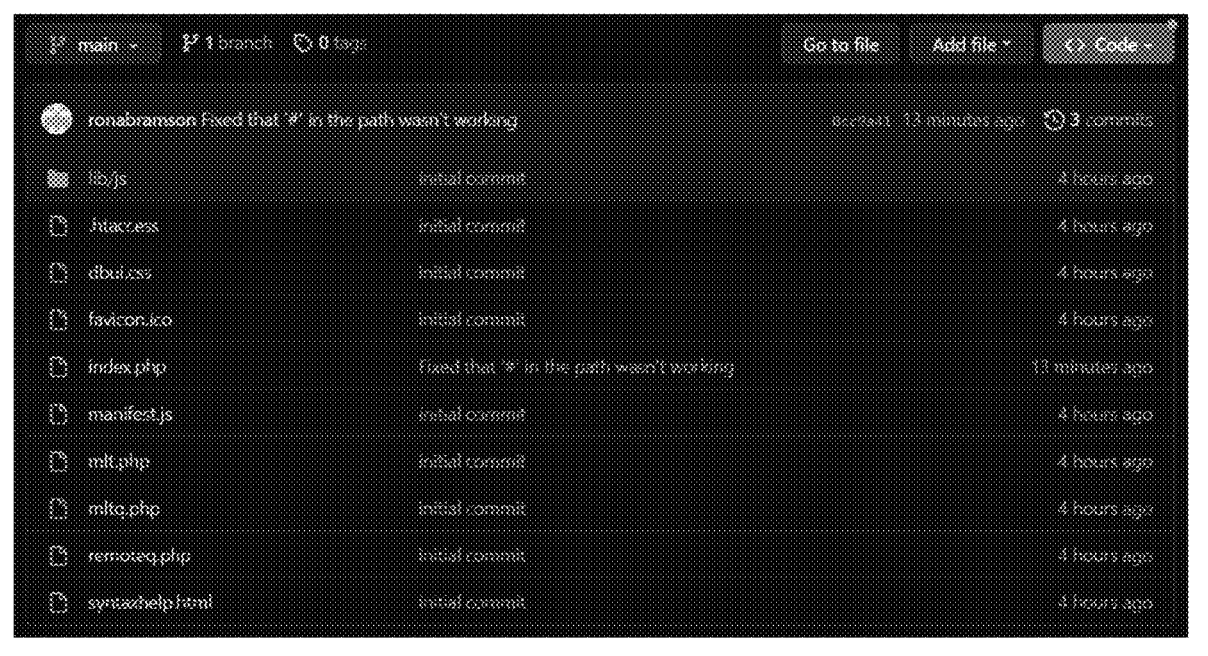

In FIGS. 3 and 4, the highlighted "Path" element in each query result is clickable by a user, and when clicked, brings up the image of the corresponding document (read from docstore/) in the provide iFrame on the right side of the display.

5. Base Example Implementation

Specific techniques used to provide the foregoing base-case functionality on the server include:

An AMI is launched from a prior working version of the server, with or without data in docstore/.

If there is no data in docstore/, or it is it desired to load a different data set, the date in question may be loaded in bulk with a tool such as WinSCP (or scp from the commandline).

Data copied to docstore/may be indexed to solr, in a manner that extracts rich content, by editing solrconfig.xml to incorporate extracting as well as highlighting request handlers, and then using the solr post tool to index the contents of docstore/.

The config edits (inserted, e.g., directly above <directoryFactory name= . . . />) include the following:

```
<lib dir="${solr.install.dir:../../..}/contrib/extraction/lib" regex=".*\.jar" />
<lib dir="${solr.install.dir:../../..}/dist/" regex="solr-cell-\d.*\.jar" />
<requestHandler name="/update/extract"
startup="lazy"
class="solr.extraction.ExtractingRequestHandler" >
<lst name="defaults">
<str name="lowernames">true</str>
<str name="fmap.content">_text_</str>
</lst>
</requestHandler>
<requestHandler name="/mlt" class="solr.MoreLikeThisHandler" />
```

The MoreLikeThisHandler is added to provide "more like this" (mlt) functionality. For example, when a search result is selected and the corresponding document displayed, a "MLT" button may be made to appear, which, when clicked, opens a new browser tab or window that displays what solr determines to be the five (for example) closest documents in docstore, in a UI otherwise similar to the main UI. The mlt functionality may be cascaded in the same manner to the result list of similar documents.

Docker may be initialized with the following:

```
docker run -d -v "$PWD/solrdata:/var/solr" -p 8983:8983 -- name u_solr solr solr-precreate ucoll
```

Note that u_solr is the name of the image and ucoll the name of the collection. Persons of skill in the art will recognize that $PWD/solrdata:/var/solr serves to mirror the solrdata directory in the solr image at/var/solr/into a corresponding directory in the local working directory, which is useful to expose configuration files and data stores.

A solr post command for this purpose is like the following:

```
docker run -v "/var/www/html/docstore:/docstore" -- network=host solr post -c ucoll
    /docstore/ -params "uprefix=attr_&fmap.content=attr_content"
/var/www/html/docstore:/docstore in this command again serves to mirror docstore/ to make it accessible to
    the solr process in Docker.
```

Encoding and decoding may be necessary to pass or retrieve strings such as file and directory names as parameters, and vice-versa. For example, some characters that are legal in file or directory names in some operating systems, such as recent versions of Windows, MacOS, or Linux, cannot be passed as such via http. This requires encoding and decoding of strings when passing parameters over the network or through the code, formatting displays, formulating queries, etc. As a simple example, a string representing a directory may have to be encoded in order to send the directory name via an http parameter, and decoded on receipt in order to fetch files from the directory, and reencoded, perhaps differently, to be displayed.

The solr service performs searches against a solr index. The application assumes that the solr server is invocable via a socket connection to localhost: 8983. For this to be the case, solr must be running. In the example presented herein, solr is run in a Docker container. The status of solr in Docker may be monitored with "docker stats" and solr may be started/restarted with "docker run [name of instance]" (such as "docker run u_solr"). Using the Docker container is convenient, because the foregoing command to run solr in Docker will retrieve a current version of solr automatically, from network sources, the first time it is run.

The running solr service may be examined directly by pointing a browser via http to [server URL]:8983. Note that solr is not natively protected by https. Since solr queries will expose indexed content, other security controls should preferably be provided. In one embodiment, security may be provided by using restrictive network access rules, such as an AWS security group, configured to limit access to port 8983 (solr) to requests from only localhost and a very limited range of specific IP addresses from which developers will be working.

The web interface may use JavaScript to allow the user to create a query based on folders within docstore/as well as content-related search terms. The directory tree of docstore/ may be traversed to generate a tree control to allow the user to pick a subdirectory or subtree hierarchy for the search. To do this, the main file is done in PHP, to trigger a server-side process to traverse docstore/and generate a corresponding directory tree UI.

A broad query such as * or ?????? will match nearly all documents and approximate browsing the user-selected folders. (?????? Is preferred because solr highlighting will choose six-letter words, making the highlighting more readable for browsing without losing many documents in the result set, as nearly all documents contain at least one six-letter word.) Content-related searches will support solr search syntax, providing a rich full-text search capability, limitable by folder.

The solr server may be queried via http requests over port 8983 (by default). The http request API for solr is documented at solr.apache.org (query-guide/query-syntax-and-parsers).

User queries may be chained through another php file on the server, remoteq.php 204. The user's query is captured from the UI and submitted as parameters (e.g., a search term string and optionally a folder to which to limit the search) via XMLHttpRequest (i.e., AJAX/xhr) to remoteq.php (on the server). The file remoteq.php formulates a solr-specific query (per the solr API), based on the selected folder and search string and including other appropriate parameters and defaults, such as for the desired highlighting, etc., and passes it to solr on localhost:8983. (Highlighting of solr results is documented at solr.apache.org (highlighting). The PHP process receives the solr results (formatted as json), and forwards them as json to a JavaScript callback function on the client browser, which in turn parses and processes the json into a tabular result list with embedded links and highlighting for the results. Document paths that are clicked on in the result list trigger a display of the corresponding document image (from docstore/) in the iFrame on the right side of the UI display.

```
$link = "http://localhost:8983/solr/$collection/select";
$qstr = "q=attr_content:$searchterm%20%7C%7C%20attr_resourcename:$searchterm".
    "&";
$qstr .= "q.op=AND" . "&";
$qstr .= "hl=true" . "&";
$qstr .= "fl=id,created" . "&";
//$qstr .= "sort=created%20asc" . "&";
$qstr .= "rows=2000" . "&";
$qstr .= "hl.simple.pre=*~" . "&";
$qstr .= "hl.simple.post=~*" . "&";
$qstr .= "hl.fl=attr_content%20attr_resourcename" . "&";
$qstr .= "hl.snippets=$snippets" . "&";
$qstr .= "hl.fragsize=200" . "&";
$qstr .= "wt=json";
$arg = $link . "?" . $qstr;
techo("<br>URL: $arg<br><br>");
$resp = file_get_contents( $arg );
    o   Note that combination query connectors must be urlencoded -
        attr_content:$searchterm%20%7C%7C%20attr_resoucename:$searchterm
```

-continued

○ The same is true for hl.fl - separate field specifiers by %20 rather than (032) space chartacter, e.g., hl.fl=attr_content%20attr_resourcename Parameters passed by remoteq.php may be such as the following:

The server should also be provisioned with a wildcard ssl/tls certificate for the domain in which the test, staging, and production server URLs will be placed. The process for creating wildcard certificates, such as with certbot, involves creating an appropriate DNS TXT record, submitting specified challenges, and conforming virtualhost entries in the web server configuration, and is documented at certbot.eff.org.

Basic authentication may be implemented for a limited number of users through standard htpasswd utilities. User and user-tracking databases may also be employed (although this implies a collection of user-related data that will evolve and change on the server, a topic addressed at greater length below).

The illustrated embodiment uses also jQuery libraries, to provide user-adjustable display panels. The jQuery libraries may be static or web-based. Static libraries are use in the example, in the lib/folder 204. jQuery also supports abbreviated reference to DOM elements.

To incorporate git functionality, first ensure that document root is accessible to git: chown -Rec2-user:apache html/var/www/html.

Then,

```
cd /var/www/html
git init
git commit -m "initial commit"
git remote add origin [github. com user repo]
git branch -M main
git push -u origin main
```

Get a PAT from GitHub. Add gh so as not to have to retype the entire PAT every time.

```
sudo yum-config-manager -- add-repo [github cli.repo]
sudo yum install gh
gh auth login
```

Workflow with Git:

Example: Edit e.g. index.php in place on the testing server, e.g., to fix that a document with the character # in its filename was not displaying in the iFrame (giving a 404 Not found error instead)—file name incorrectly encoded.

Save Edited File:

```
$ git add index.php
$ git commit -m "Fixed that '#' in the path wasn't working"
  [main ecc9a41] Fixed that '#' in the path wasn't working
  1 file changed, 14 insertions(+), 4 deletions(-)
```

-continued

```
$ git push -u origin main
  Enumerating objects: 5, done.
  Counting objects: 100% (5/5), done.
  Compressing objects: 100% (3/3), done.
  Writing objects: 100% (3/3), 795 bytes | 795.80 KlB/s, done.
  Total 3 (delta 2), reused 0 (delta 0), pack-reused 0
  remote: Resolving deltas: 100% (2/2), completed with 2 local objects.
  To [github.com] [user ]/document-review.git
    [label] main -> main
branch 'main' set up to track 'origin/main'.
```

After carrying out the foregoing, an example of what can then be seen on GitHub is shown in FIG. 4.

Incorporation of further details of the server implementation such as icons and stylesheet elements will be apparent to those skilled in the art.

6. External Supporting Database

A supporting database may be external to the server instances, and shared. For example, the supporting database (regardless of type, e.g., SQL, NoSQL (such as solr), etc.) may be accessible over an IP network at a given port or port range, at an IP address associated with a plurality of host names. Using reverse proxy directives, the supporting database may be made accessible to the various separate hosts, comprising a test instance, a production instance, and zero or more staging instances. Alternately, multiple shared access can be provided for completely different lines of applications that share the same underlying type of database engine. In any case, virtualhost headers are also put in place to allow cross-origin requests, allowing a plurality of instances to share a common database engine.

For a reverse proxy for solr on the existing Apache httpd server: Add the following to /etc/httpd/conf.d/ssl.conf

```
LoadModule proxy_module modules/mod_proxy.so
#LoadModule proxy_balancer_module modules/mod_proxy_balancer.so # not needed
LoadModule proxy_http_module modules/mod_proxy_http.so
```

Also in the (applicable) VirtualHost section:

```
<VirtualHost _default_: 443>
***
ProxyPass /solr [local solr server URL]
ProxyPassReverse /solr [local solr server URL]
***
</VirtualHost>
```

Note that the above proxies the ordinary local solr service via http on localhost: 8983 over a protected HTTPS connection to the outside.

To support cross-origin access, First install the Apache headers module

```
sudo apt install apache2-dev
```

In /etc/httpd/conf.d/ssl.conf, add LoadModule . . . for the headers and Header set . . . for the Access-Control header

```
***
LoadModule headers_module modules/mod_headers.so
***
<VirtualHost _default_:443>
***
Header set Access-Control-Allow-Origin "*"
***
</VirtualHost>
```

7. Operational Aspects of a Rotated Server Implementation

In any of the examples reviewed above, the web server source code may be edited directly on the test instance and tested immediately. The process can be repeated indefinitely: the new test and production instances can be re-rotated, in a rolling manner. As a result, generations of successive, complete, and working AMI images are created (and in themselves provide substantial "backup" for the application, in addition to other backup measures for machine images per se, such as AWS Backup Services), with minimal and in some cases no modification to the code running on any of the servers.

There is also no code deployment required, as the desired new code is already in place and tested in the instance that becomes the new production server. Similarly, the new test server that is launched from the saved machine image of the current test server likewise already has the same code on startup. As discussed, the running instance can be automatically updated as to its test, staging, or production status.

a) Source Code Control

Version control may be incorporated, to provide a ready audit trail of edits, an easy ability to diff changes, or to review, effect branches and merges, etc. on successive versions of the source code. To achieve such functionality, distributed source code control software, such as git, may be installed (as seen in FIG. 2 with .git 207). git is preferably installed directly on the test server, and then linked to an online repo (such as GitHub) as well, so developers can edit in the live code directory for the test server, which in such an embodiment is also a git repository.

The working code is thus already in place on the test server, and need not be "deployed" (in the prior art manner) to either the test or production server.

Upon rotation, the production server will also have the git repo, but it will not ordinarily be used as such on the production server.

Other developers (who are authorized) can participate in development on one test machine, instantiate one or more other test machines from a test machine's AMI and develop a local branch on the new test machine, which can be reviewed and merged in the usual manner and introduced into the rotation.

Configuration files 211 on the AMI (such as, for example, /etc/httpd/conf/httpd.conf) similarly persist on rotation as well, and like the source code, can also be tracked and versioned in git. Such files may include Apache configuration files, scripts, cron jobs, and the like.

b) Data Updates

In the given example, there is a substantial amount of data on the server, in docstore/ 202. The data in such an embodiment is "read only" while in production and may reside on the web server, as a directory hierarchy accessible to the web server under the document root. However, although "read only" in the sense described, on the testing instance, the data in docstore/may be added to, modified, or replaced, and the corresponding solr indexes updated or regenerated, all of which travel with the AMI, through any server rotation. Thus, the data may be updated on the test server and rotated into place, along with any code or configuration changes, with no need to edit or update anything on the production server.

Changes to the data in docstore/ 202 may introduce new or changed data, which could include data that breaks existing code or configuration, requiring code or configuration changes to accommodate or process the changed data. For example, changed data may introduce different or wider character sets that were not accommodated by the prior code, requiring an update to the code. Or data may be reorganized, etc., requiring a code or configuration change. All of this can be done on the test server and simply migrated into production on the next rotation, and carried forward in successive AMIs thereafter, with the code and configuration changes tracked in the integrated git repo.

c) Other Types of Servers

Other types of servers may be run, such as a web server backed by a relational or object database, using the same techniques described herein. Services such as an RDBMS or object store can be run internal to the server, or run on an external server or service and accessed over an external network interface.

The examples given use an Apache web server. The same techniques will apply equally to a server implemented in node.js, or on alternative web servers such as nginx.

Other types of web servers may be rotated by the same scheme. For example, test, staging, and/or production versions of a web server backed by a relational database may be rotated in the same manner.

Example of a Multi-Level Test-Staging-Production Implementation and Non-Static Data

8. Multi-Level Implementations

In a multi-level system comprising staging servers as well as test and production servers, server rotations may be by level. An example is show in FIG. 5.

Figure 5:
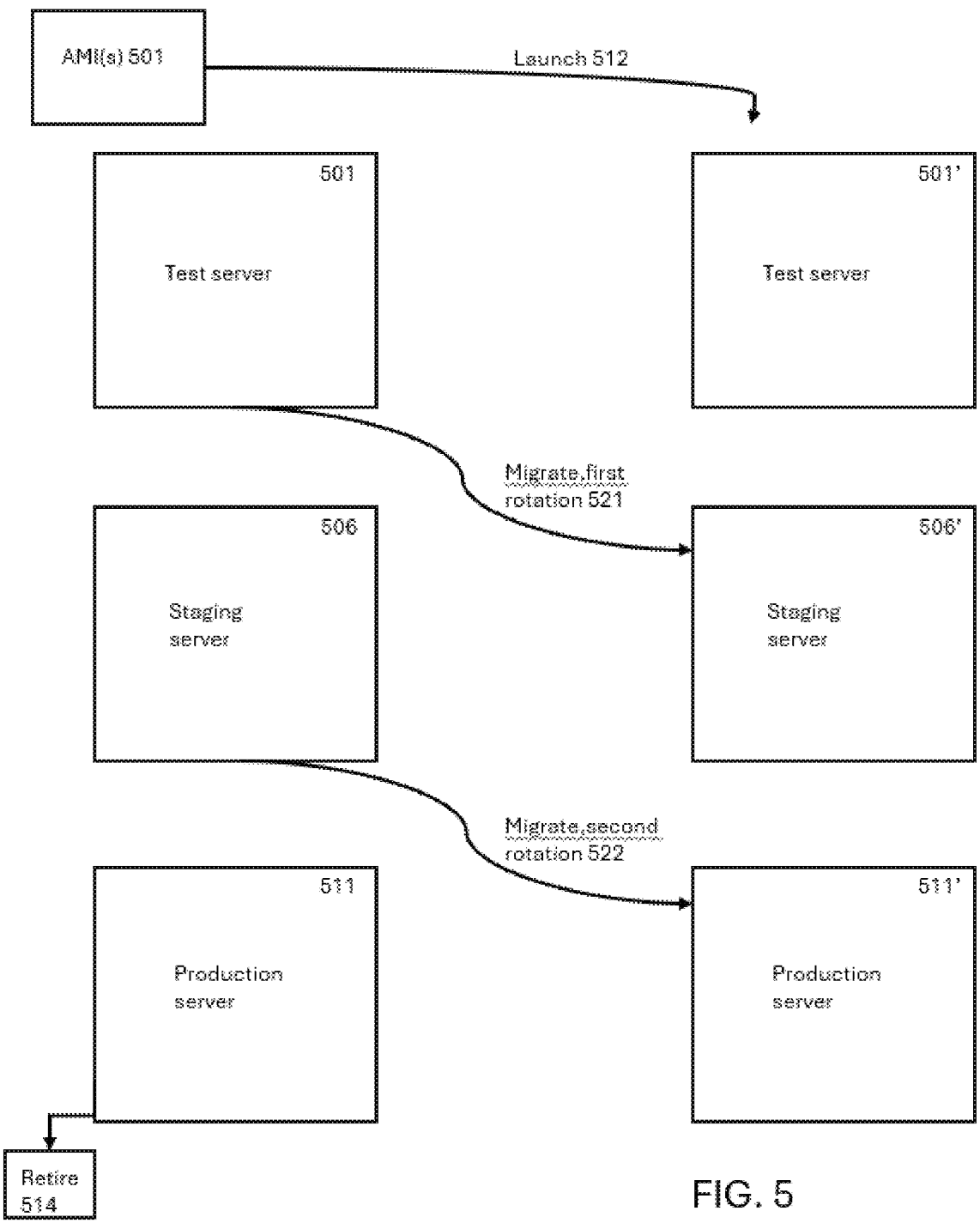
FIG. 5 shows schematically how external resources such as an RDBMS server used by a server in rotation in accordance with this disclosure may be managed to maintain consistency.

For example, as illustrated in FIG. 5, in a system with a test server 501, one staging server 506, and a production server 511, a first rotation 521 may be established with the test 501 and staging 506 servers, and a second rotation 522 may be established with the staging 506 and the production 511 servers. The test server 501 can thus be rotated into staging 506'. The staging server 506 may be tested and modified separately and rotated on its own schedule into production (511'). As far as server programming and configuration is concerned ("systemspace" changes), the rotation on each level is similar to the above-described rotation pattern for a simple test-production rotation.

9. Servers with Non-Static Data

Another set of possibilities is presented where the data in a supporting server, such as a database, on which the web server depends, is read/write, and allows user-induced data changes during production use. This includes a great many business applications that manage data which changes on an ongoing basis, as well as databases of user credentials and data, which likewise change as new users and data about them are added or accumulate in the system. In such cases, the database contents will begin to diverge from those contents that existed upon server rotation, simply as a result of ordinary production use. Changes of the nature described in this paragraph are typically associated with changes a user has permission to make, and are referred to herein as "userspace" changes. (As a shorthand, "userspace" matter may be thought of as data that an end user has permissions to add, update, or delete (to the extent the system provides for deletion).)

Programs tied to databases often use mock databases for testing, particularly, unit testing. Having a "real" database for testing (with the ability not to commit, or to back out, data changes due to testing) can be advantageous, to provide more certainty as to the tests.

On the other hand, changes may be made, separately to the testing version of the database, which may go beyond the types of changes that users are allowed to make, for example, schema changes. These changes, to the extent to the schema, or other aspects of the database other than user-supplied data, will need to be rolled into the production database upon server rotation, and all data changes in the production version that occurred since the prior rotation must be carried forward on rotation into the next production instance as well, in a manner that conforms to the modified schema or like changes. Changes of the nature described in this paragraph are typically associated with changes that require a permission level or a developer or administrator, and are referred to herein as "systemspace" changes. (The "userspace" and "systemspace" categories as intended hereunder will generally be distinct.)

In a multi-level system, preferably, all userspace changes will flow all the way upstream, and are committed at all upstream levels (contrary to the separate level-based rotations for systemspace changes).

Systemspace changes get pushed down incrementally, through level-by-level rotations. Userspace changes get pushed upwards, to all upstream levels.

Preferably, the upward userspace data sync described above will be what is known as a "one-way sync" at each level, so that each level will have ingested and will be working with the latest production data, at least by the time a rotation is done at that level. However, any userspace changes that happen to be made on a testing basis at any level above actual production will generally not be synced upwards, nor will they be synced downwards. Where this cannot be done (meaning that the userspace changes, even though made at some testing level, cannot be disregarded), any such upstream-going userspace changes that happened to originate from testing can be applied selectively as circumstances may require. Two-way sync methods may be incorporated as well, to the extent it may be necessary. However, one-way upward syncs of production userspace changes, through all server levels, should ordinarily be sufficient.

If there are database schema changes made at a testing level, data synced to that level thereafter will be conformed to the changed schema. Preferably this will be done for newly arriving userspace data in the same manner that existing userspace data at that test level was previously conformed when the schema change was made at that level. For example, if a field was changed in testing from a 16-bit type to a 32-bit type, and when the schema change was made, existing 16-bit field contents in the test database were cast to 32 bits, 16-bit production data mirrored to the test server after the schema change was made will be cast in the same manner to 32 bits before being committed to the database.

To implement such syncing, preferably there will be a record or discovery mechanism in the server AMI (as previously discussed), identifying whether it is currently in testing, staging, or production status.

Processes in the AMI can read probeinfo.js (or otherwise determine the AMI's status, as discussed below), determine if it is running as a test, staging, or production instance, and on that basis, (i) change versioning information shown in the UI (so a user can readily see from the UI if he/she is accessing a test server, as well as the versioning level of the server), and (ii) redirect external services, such as a connection to a live database, to a test or staging version of the database, as appropriate, so that testing does not alter or corrupt the live production database. If the database structure is changed in a test or staging version, or other wholesale changes introduced, the changes may be separately merged or rotated into production. Likewise, data entered by users during staging, once validated, may also be merged into the production database.

Other services that do not lend themselves to testing, such as a web server routinely that sends email or text messages to users, where (for example) it is not desirable to trouble users with emails generated only for testing, can be rotated into testing by sandboxing the email or text message service, for example, incorporating a module that rewrites email addresses when test status is activated or detected, or swaps in a different email system or port, for testing. Such sandboxing may be activated upon the instance detecting that it is a test instance. Products that provide such sandboxing include Amazon SES mailbox simulator, aws.amazon.com (mailbox-simulator-for-the-amazon-simple-email-service). Other tools, such as smtp4dev, github.com (rnwood's smtp4dev), which may also be run under Docker, may also be used.

With numerous users, user authentication may also require robust database support. The example embodiment uses Basic Authentication, with an .htpasswd file in the AMI covering all authorized users. This is suitable for a small group of users, and is self-contained on the server (within the AMI), and thus automatically migrates on server rotation. On the other hand, a larger deployment, with a multitude of users and substantial user data (such as from cookie stores, user history, location information, etc.) will most certainly require a read/write database, preferably provided to the server as an external service. Such a user database would be versioned as to production, staging, and testing as described above.

The server rotation techniques described above may also be employed where the web application provided by the server relies on one or more databases that necessarily change during use. An example, below, is discussed in terms of a single relational database (e.g., to support an application such as sales or CRM), which can be readily expanded in a like manner to any number or different types of databases (including for example user authentication/account databases, etc.)

Figure 6:
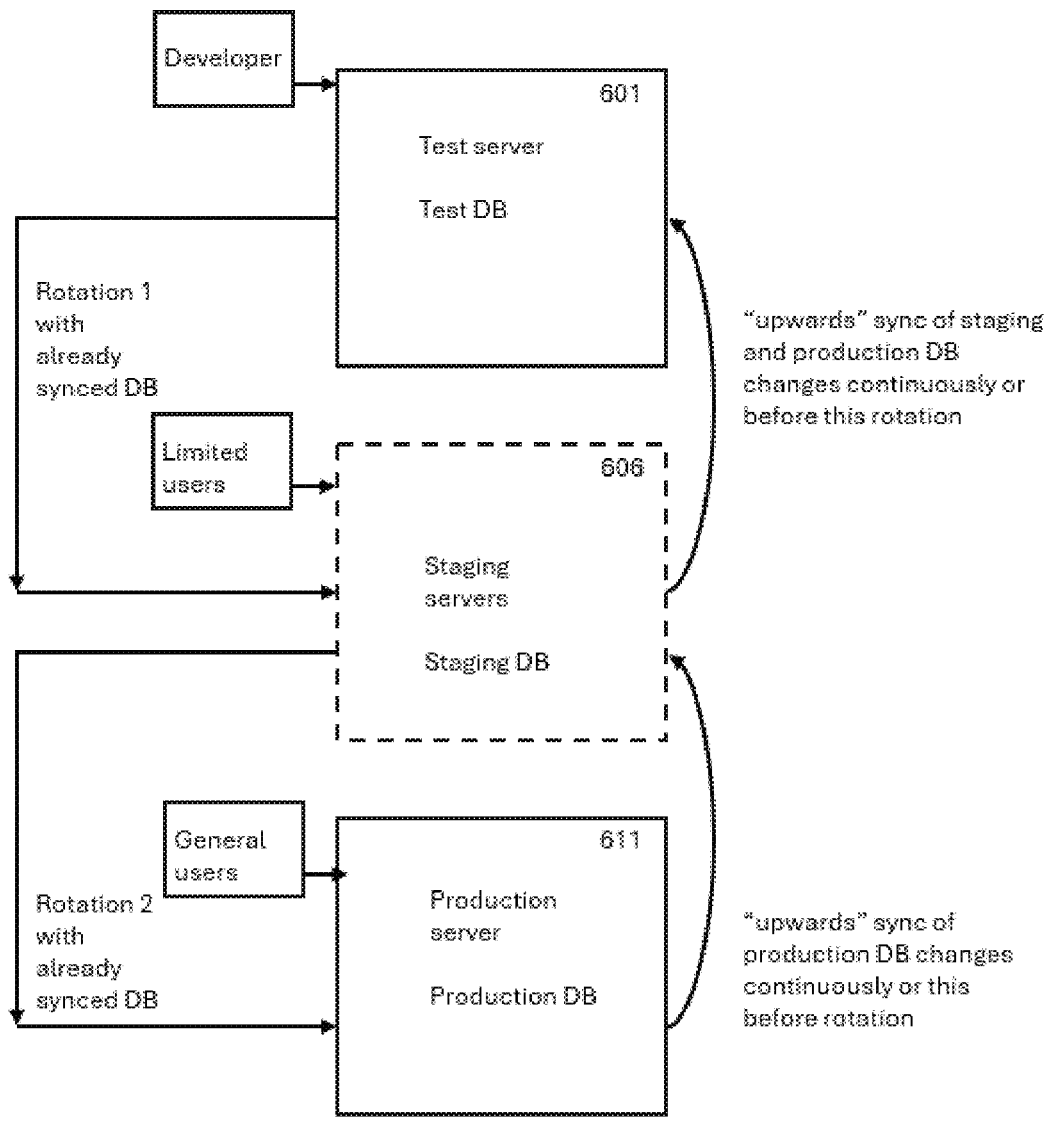
FIG. 6 schematically illustrates multi-level test-staging-production multi-level rotation incorporating a one-way upward data sync.

FIG. 6 is a schematic diagram of a web application that relies on a database that normally changes during production use.

Just as server rotations work their way downward (incrementally, e.g., as shown with "Rotation 1" and "Rotation 2"

in FIG. 6), database changes are mirrored upward (though across levels rather than incrementally), in the production-staging-test hierarchy.

With reference to FIG. 6, it is seen that, as userspace changes occur on production server 611, the changes may be mirrored onto staging server 606. This may be done continuously, or in one or more batches at any time prior or up to the next rotation of production server 611, or preferably, before the next rotation of any server in the production-staging-test hierarchy.

Likewise, in a separate cycle, mirrored userspace changes from production, as well as any unsynced system- or userspace changes on staging server 606 may be mirrored, continuously, or prior to any further rotation, onto test server 601.

Upon any server rotation, the database that will be on the "production" side of the rotation will be in sync with the production database, so it may be rotated downward toward production without necessary waiting. In other words, systemspace changes are held back until they are deemed ready for rotation, whereas userspace changes are propagated upward without such holds.

Events also may take place that change the state of one or more servers, but in a transient manner. For example, users may be provided with automatically generated links to which they may respond, for example, in a survey. However, to the extent operationally significant, such response will be reflected in a database of some sort associated with the server. It will often be sufficient to mirror upwards only the persistent userspace changes that result from such events, such as transactions saved to a database.

On server rotation, the new production server (inherited from the prior test server) may (in one embodiment) determine, e.g., from probeinfo.js (or by other methods such as the IP address assignment, DNS records, a directory server, etc.) that it is a production instance, and redirect it database connection to the production database, i.e., cause the database services to switch roles. Techniques for mirroring database events are reflected in documentation such as learn.microsoft.com (database-mirroring-sql-server), referenced above. Techniques for maximizing availability when cutting over, e.g., from a production database to a disaster recovery database are also known, in products such as Oracle® Plan DR, which may be utilized for rotating application servers associated with highly active databases.

The web server's dependency on the database can optionally be isolated from the server image by putting the database server on a different machine and/or providing the database functionality to the web server as a service. Alternately, the database server may run on the same machine (server image) as the web (application) server. If so separated-Test and production database servers may be rotated in substantially the same way as the application servers, by changing DNS entries or addressing for the database servers.

Similar to the production server, the new test server (based on the AMI of the prior test server) may determines, e.g., from probeinfo.js, that it is a test instance, and redirect it database connection to the test database.

The test database for a new test instance will be identical at the outset to the production database.

Changes may be made during testing, from the test server, to the database schema and/or data. All such changes are preferably logged. Userspace changes on a test server that are not intended to flow into the production database on the next rotation may be flagged for "testing" status and/or flagged for rollback prior to rotation. Otherwise, changes to the database made in testing will become part of the production database on the next rotation.

In the event the schema has been changed in testing in a manner that affects the storage of data, mirrored transactions coming in from a lower level production server, which did not have the schema change locally in effect, can be modified to accommodate the schema changes in the same manner that was applied to data already in the test database when the schema was modified.

Alternately, the test database may be synced with the production database upon rotation, merging the accumulated mirrored data changes received from the production database since the prior rotation.

In either case, the rotation process takes some time, and although that time may be relatively short, additional transactions may take place on the production database during that time, especially in high-volume, high-availability settings. These data changes may be mirrored as well, but a "rotating" flag is raised on the test server upon beginning the rotation, and in the presence of such a "rotating" flag, mirrored, uncommitted changes at that time will not be committed until after the rotation. Upon the (new) production server determining that it is the production server (by checking probeinfo.js), it can reset the "rotating" flag" and commit the transactions that accumulated during the rotation and were not committed on the test server (the cache by this time will now on the production database server by virtue of the rotation).

Automated Sequence Setup

A facility such as a cloud service provider, may provide a feature on its service to transform any web server and/or supporting database into a test-staging-production hierarchy in accordance with this disclosure by a scripted or otherwise automated mechanism. Such a mechanism would start from a working server instance and generate the AMIs, IP addresses, DNS entries, wildcard certificates, virtualhost configurations based thereon all as set forth herein. For example, scripts for generating/renewing suitable wildcard certificates already exist (e.g., the certbot scripts), and the various cloud services provided such as Amazon provide command line scripting tools to carry out the other required configurations as described herein. Such scripts may incorporate a property sheet, in which the user may specify, e.g., server types, test-staging-production sequence, and virtual machine characteristics of the AMIs to be generated.

Automated Summaries

The remote query facility may also call out to a summarizing engine (e.g., AI summarizing engine) to return a summary for each document being displayed. The summary is fetched (on a document-by-document basis) only if it doesn't exist (or is not deemed current), and when fetched is added to a solr field for the document.

APPENDIX

The following details are specific to building the application used to illustrate an embodiment under this disclosure.

The following describes how to build servers such as those described herein, and in particular a document review/search server, in the first instance. In the document search and review platform described below, the document store and corresponding index are static during any given user session, and in particular, there are no user updates to the document store that occur during active production use. Note that the following is for building such a server from the ground up.

If the servers already exist, and the desire is just to rotate them and/or continue to maintain and develop on them, most of the steps described below are not necessary. In that case, the last section below, on server rotation, is the most relevant.

Launch an AWS Linux 2 Medium Instance (4G Memory, 24G SSD)

Name (arbitrary—e.g., Docsite2), Amazon Linux 2 Kernel 5.10 AMI 2.0.20221210.1 x86_64 HVM gp2, 64-bit (x86), instance type: t2.medium, keypair (exiting or new, retrieve or save the .pem identify file) (Small instance will often work as well)

Security groups. This is using three security groups. The first one is the base configuration, for ports 80, 443, and 8983 (restricted to localhost). The other two groups open up port 8893 for access from specific IPs (e.g., IPs that will be used by developers). Controlling access on port 8893 is important because solr will provide access to the contents of sensitive documents Choose 24 GB SSD (depending on the size of docstore), and launch Create an elastic IP, 54.54.54.78, and associate it with this instance Go to registrar and create a DNS A record pointing to this: test.adomain.com ssh to it to test—ssh -i docsite.pem ec2-user@test.adomain.com Apache (httpd), PHP

```
sudo yum update
sudo yum install -y httpd
sudo systemctl enable httpd
sudo systemctl start httpd
sudo amazon-linux-extras install -y lamp-mariadb10.2-php7.2 php7. 2
```

Do the above to install. mariadb is optional, depending on whether the application requires an RDBMS. Fix permissions to be able to edit web pages with a normal login:

```
sudo usermod -a -G apache ec2-user (log out/back in again to activate)
sudo chown -R ec2-user:apache /var/www
sudo chmod 2775 /var/www && find /var/www -type d -exec sudo chmod 2775 { } \;
find /var/www -type f -exec sudo chmod 0664 { } \;
```

In addition, apply this to/var/www/html (for git (later), to make sure the document root directory it is owned by ec2-user: apache).

Make sure VS Code works as a remote edit (use ssh plugin).

Test with phpinfo, nano /var/www/html/phpinfo.php add <?php phpinfo( ); ?> (then delete the file).

Make sure the server and its document root are reachable via WinSCP for copying files.

https—Certbot

```
sudo yum install -y mod_ssl
sudo wget -r --no-parent -A 'epel-release -*. rpm'
[dl.fedoraproject.org epel packages]
sudo rpm -Uvh dl.fedoraproject.org/pub/epel/7/x86_64/Packages/e/epel-release-*.rpm
sudo yum-config-manager --enable epel*
sudo yum repolist all (to confirm EPEL is in the repo list)
```

Edit the main Apache configuration file,

```
sudo nano /etc/httpd/conf/httpd.conf
```

Locate the "Listen 80" directive and add the following lines after it, replacing the example domain names with the actual Common Name and Subject Alternative Name (SAN).

```
<VirtualHost *:80>
DocumentRoot "/var/www/html"
ServerName "test.adomain.com"
ServerAlias "test.adomain.com"
</VirtualHost>
sudo systemctl restart httpd
sudo amazon-linux-extras install epel -y
sudo yum install -y certbot python2-certbot-apache
sudo certbot
```

Configure Cron for automatic Certbot renewals (add 39 1,13 * * * root certbot renew—no-self-upgrade) to crontab and restart cron.

Test test.adomain.com to see if it provides a secure connection ("lock" displayed in the address bar). Password protect the site:

```
sudo htpasswd -c /etc/httpd/.htpasswd ron
sudo htpasswd /etc/httpd/.htpasswd catherine [note no -c]
sudo nano /etc/httpd/conf/httpd.conf
```

In <Directory /var/www/html>

```
AllowOverride All
```

In /var/www/html add .htaccess:

```
nano /var/www/html/.htaccess
AuthType Basic
AuthName "Password Required!"
AuthUserFile /etc/httpd/.htpasswd
Require valid-user
sudo service httpd restart
```

Test that it now requires a log in.

```
sudo yum install docker
docker version
[docs.docker.com]   /engine/install/linux-postinstall/
sudo systemctl enable docker.service
sudo systemctl start docker.service
sudo systemctl status docker.service
sudo groupadd docker
sudo usermod -aG docker $USER
newgrp docker
docker run hello-world
```

Docker
Do the above and then reboot as well.
Solr Setup

```
mkdir solrdata [local directory to contain solr configurations]
sudo chown -R 8983:8983 solrdata [do this because it will need
to be able to write to /var/solr as user 8983:8983]
```

Then, for first-time run (only):

```
docker run -d -v "$PWD/solrdata:/var/solr" -p 8983:8983 --name
u_solr solr solr-precreate ucoll
```

On some systems, use $(pwd). the identifiers u_solr and ucoll are of course arbitrary, but important to the extent incorporated in the code. Run docker stats to see it running (^c to exit stats). For later runs, to restart, just do this:

```
docker start u_solr
```

Brief Explanation of Docker Virtual Mounts:
For the -v virtual mount in a Linux Docker installation, try this undetached (without -d).
If there is a permission error on the mount dir (solrdata), try chmod-ing solrdata to 8983:8983 and then run it again detached. It should be possible then to edit the external file solrconfig.xml, under solrdata (to insert the lines shown further below).
The -v option specifies the path to a directory on the host machine and the path where it is desired to mount it inside the container. For example:

```
docker run -v /path/on/host:/path/in/container image_name
```

This mounts the /path/on/host directory from the host machine to the /path/in/container directory inside the container. This allows data to be shared between the host machine and the container, or to persist data even if the container is stopped or removed.
In Docker, a bind mount is used to mount a directory from the host machine into a container. When you use a bind mount, the files and directories in the host directory are directly accessible from inside the container.
The specified path on the host must be absolute
The path specified for the mount inside the container is the path where the bind mount will be accessible from inside the container. This path does not need to be an absolute path, and can be a relative path.
However, it is generally a good practice to use absolute paths for the mount inside the container to avoid any confusion or issues. Using an absolute path ensures that the mount will always be accessible at the same location, regardless of the current working directory inside the container.
Add an extractingRequestHandler in the config for the collection so the system can index rich documents.

```
docker stop u_solr
```

Go into solrdata and drill down to data/coreName/conf/solrconfig.xml. Stop solr. Add the following to solrconfig.xml found in that directory (so that solr will set up an extractingRequestHandler for this collection):

```
insert the following directly above <directoryFactory name= ... />
<lib dir="${solr.install.dir:../../..}/contrib/extraction/lib" regex=".*\.jar" />
<lib dir="${solr.install.dir:../../..}/dist/" regex="solr-cell-\d.*\.jar" />
(indents and white space do not matter)
<requestHandler name="/update/extract"
    startup="lazy"
    class="solr.extraction.ExtractingRequestHandler" >
<lst name="defaults">
  <str name="lowernames">true</str>
  <str name="fmap.content">_text_</str>
</lst>
</requestHandler>
```

Save solrconfig.xml, and restart solr. Check the solr admin panel in a browser. Via http, URL]: 8983 (make sure it is not https. Look at files for the core and make sure the code for extractingRequestHandler is there.

```
mkdir /var/www/html/docstore
```

Loading Data into Solr
Use winscp to load the document files in docstore. The web server will access these files, to display them and read their directory structure. As will solr, through a virtual mount, in order to index them.
Start Using Solr
Ascertain the name of the solr collection (example: ucoll). Index and post the content using the solr post tool:

```
docker run -v "/var/www/html/docstore:/docstore"
--network=host solr post -c ucoll /docstore/ -
params "uprefix=attr_&fmap.content=attr_content,"
[deprecated:] docker run -v "/var/www/html/docstore:/docstore"
--network=host solr post -c ucoll /docstore/ -params
"uprefix=attr_&fmap.content=attr_content,id"
``` if it returns 404 check to make sure the extracting request handler is working. Try via http [siteURL]:8983/solr/update/extract and see if it is responding, if not, check solrconfig.xml.
Query Solr
Substance of query (made from the web server via PHP), e.g., for "sanctions":

```
[local solr
server]/solr/#/ucoll/query?q=attr_content:sanctions&q.op=
OR&indent=true&rows=1000&fl=attr_resourcename%20a
ttr_content&hl=true&hl.fl=attr_content%20attr_resourcename&hl.
simple.pre=***&hl.simple.post=***&useParams=
```

The following is the query spec in remoteq.php ($collection and $searchterm are PHP variables supplied at run time):

```
$link = "[local solr server] localhost:8983/solr/$collection/select";
$qstr = "q=attr_content:$searchterm%20%7C%7C%20attr_
resourcename:$searchterm" . "&";
$qstr .= "q.op=AND" . "&";
$qstr .= "hl=true" . "&";
$qstr .= "fl=id,created" . "&";
//$qstr .= "sort=created%20asc" . "&";
$qstr .= "rows=2000" . "&";
$qstr .= "hl.simple.pre=*~" . "&";
```

-continued

```
$qstr .= "hl.simple.post=~*" . "&";
$qstr .= "hl.fl=attr_content%20attr_resourcename" . "&";
$qstr .= "hl.snippets=$snippets" . "&";
$qstr .= "hl.fragsize=200" . "&";
$qstr .= "wt=json";
$arg = $link . "?" . $qstr;
techo("<br>URL: $arg<br><br>");
$resp = file_get_contents( $arg );
```

Note that combination query connectors must be urlencoded—attr_content: $searchterm%20%7C%7C%20attr_resoucename:$searchterm Same is true for hl.fl—separate field specifiers by %20 rather than (032) space character, e.g., hl.fl=attr_content%20attr_resourcename Website Design (Refer to Code Listings that Follow)
Files:

```
index.php
favicon.ico
igen.css
remoteq.php
gendata.js (vestigial)
```

Explanation of Structure:

jQuery for high-level page layout.

Document list is on the left (west), iFrame on right (referred to as "center").

Input search box is in a header, shows number of hits in header too.

Page makes xhr to remoteq.php on the server, which in turn queries localhost:8983/solr on the server.

solr returns json response to remoteq.php, which forwards it as json to our running client.

On the receiving end (browser client) we separate the json from the surrounding response html<<DOCTYPE> etc. and </body></html>. Thus, trim the response to pure json.

Parse the json back to a JS structure, called jobj.

At highest level, jobj has responseHeader, response, and highlighting. However, highlighting from solr contains an associative array in which the Ids are document paths. Cannot iterate these by foreach; cannot reference these by [0], [1], etc. Instead, do:

```
for(var key in jobj.highlighting)
```

—and—

```
for (var key2 in jobj.highlighting[key]) {
    for (let i = 0; i < jobj.highlighting[key][key2].length; i++)
}
```

This iterates over the jobj structure, getting to the documents, and for each document, the (variable number of) snippets in attr_content and respourcename. The latter arrays can be addressed by [key], which are numbers.

Report: jobj.response.numFound—write it to Results (count) in the header.

Using the for loops above, build strings to populate <tr><td>blah</td></tr> on the west panel Put the resourcename result in as the Path, as a link: Put the link in a span with an incrementing id; Use the id to highlight the "selected" link; Use a "target" attribute to get linked docs to display in the iFrame; <br> and then lay in the snippets. Snippets for attr_content and resourcename are all treated as snippets. Names can be rich so they can generate good snippets. Trim out metadata in the content, e.g., matter from pdfs up to docinfo:producer. Convert text markup (~* *~) to CSS highlight tags, to show highlights as yellow. Display the whole thing (results including paths and snippets) in the west pane. Select/highlight entry zero and display the corresponding document in the iFrame.

Adding domain to Certbot certificate, see superuser.com (question 1432541 how-to-add-a-domain-to-existing-certificate-generated-by-let-s-encrypt-certbot).

With certbot 0.34.0, the procedure is simple and easy (depending on your system, substitute certbot-auto or ~/certbot-auto for certbot). First, list your existing certificate and domains:

```
sudo certbot certificates
```

This will return your certificate name and the domains currently on the certificate, for example:

```
Found the following certs: Certificate Name: foo.example.com
Domains: foo.example.com bar.example.com
Expiry Date: 2119-08-01 11:30:32+00:00 (VALID: 89 days)
Certificate Path: /etc/letsencrypt/live/foo.example.com/fullchain.pem
Private Key Path: /etc/letsencrypt/live/foo.example.com/privkey.pem
```

Then add commas between the domains listed after the Domains: line above, add another comma, and the domain you want to add, for example, to add baz.example.com:

```
sudo certbot --expand -d [domain]
``` note, no spaces between added domains. I started with d13.lautility.com, which I added on top of btest.utility.com.

Idea is to be able to use, e.g., d0 through d12.adomain.com for actual sites, with the same AMI.

Reusing an AMI

For example, to repurpose an AMI for a new data set, different application, etc. The following need not be done for routine rotation.

Current working site is Docsite2 EC2 instance, test.adomain.com, 54.54.54.78. Reserve this IP for test site: 44.44.44.241. In this example, test on test.adomain.com (on the 44* IP). Launch stored Docsite AMI, as t2.medium (or small), use same three security groups, assign Elastic IP, point domain/subdomain to it in DNS (or rotate Elastic IPs instead)

```
docker stats
docker start u_solr
docker stats
```

Test solr web console, via http, test.adomain.com:8983. Revert httpd.conf to vanilla (no virtualhost etc). It will now be vanilla2.conf. But AllowOverride All for .htaccess (already changed vanilla file to reflect this). Test insecure (http) site. Add the virtualhost config for 80 (can also do this upfront in vanilla).

```
sudo certbot delete [existing from AMI]
sudo systemctl restart httpd
```

Run certbot as above.

Wildcard: see linkedin.com (pulse's wildcard-certificates-using-lets-encrypt-certbot-pallavi-udhane).

When the TXT record into Google Domains, only type _acme-challenge for the host name, not acme-challenge.example.com. The latter causes the TXT record host name to be incorrect.

Properly submitted, the first challenge should successfully go through. It will then be necessary to pass a second random string challenge to get the wildcard certificate to work.

Note that when using Google Domains, for the second TXT challenge, do not create a new TXT record or replace the current TXT record value. Instead, you add a new value to the existing TXT record (while keeping the first value unedited).

Also, upon this working, it is necessary to update the /etc/httpd/conf/httpd.conf and /etc/httpd/conf/httpd-le-ssl.conf files on the server to have a ServerAlias of *.example.com to get it to work. It is also necessary to restart Apache after this is all done as well.

Spinning Up a Docsite Image

Create @, *, and test A records for adomain.com (test.adomain.com=3.3.3.238) (* may not be necessary). Launch a t2.small instance from a Docsite-wildcard AMI, and ssh into it.

```
docker stats
docker start u_solr
test test.adomain.com:8983
sudo certbot certificates
sudo certbot delete
```

```
sudo certbot certonly --manual
   --preferred-challenges=dns --email admin@example.com
   --server [api.letsencrypt.org acme server]
   --agree-tos -d adomain.com -d *.adomain.com
```

Note: in Amazon's Route53 DNS, enter the two strings in one _acme-challenge TXT record, on separate lines (each string in quotes).

```
sudo nano /etc/httpd/conf/httpd.conf
(change targets to adomain.com and *.adomain.com)
```

Arbitrary subdomains of adomain.com should now work, with https. Note: Wildcard certificates and wildcard DNS A records are two different things.

Adding "More Like This" (MLT) Functionality

Object: provide the user the ability to fetch "more like this" for any selected document returned by a query.

```
docker stats
docker start u_solr
```

AWS: Spin up the stored adomain.com wildcard AMI as a t2.small instance and elastic IP (use, e.g., 3.3.3.238), and set DNS for mlt.adomain.com.

Test mlt.adomain.com:8983. Make sure all is working so far.

Add this to solrconfig.xml (on top of (i.e., directly following) the earlier additions) and restart solr:

```
<requestHandler name="/mlt" class="solr.MoreLikeThisHandler" />
```

Try this:

```
[mlt.adomain.com solr site] /solr/#/ucoll/mlt?df=attr_content&q=id:
"/docstore/zWSW_Extranet/Pleadings _788978.000010_/2022.01.18_ 199_ Ex. A to Letter(110856814.1).PDF" &
mlt.fl=attr_content
curl '[local solr server]
/solr/ucoll/mlt/?df=attr_content&q=id:%2Fdocstore%2FzWSW_Extranet%2FPleadings%20_788978.000010_%2F2022.01.
18_%20199_%20Ex.%20A%20to%20Letter(110856814.1).PDF&mlt.fl=attr_content'
/docstore/zWSW_Extranet/Discovery _788978.000010_/Third Party Requests/WXXXXXX (Immigration)/2017.11.21_
Jones Nov 21 interview summary(111275000.1).DOCX
curl '[local solr server] /solr/ucoll/mlt/?df=attr_content&q=id:/docstore/zWSW_Extranet/Discovery
_788978.000010_/Third Party Requests/WXXXXXX (Immigration)/2017.11.21_ Jones Nov 21 interview
summary(111275000.1).DOCX&mlt.fl=attr_content'
"/docstore/zWSW_Extranet/Discovery _788978.000010_/Third Party Requests/WXXXXXX (Immigration)/2017.11.21_
Jones Nov 21 interview summary(111275000.1).DOCX"
```

This was effective in 8983 solr admin console (urlencode the id), setting /mlt in the GUI:

```
[mlt.adomain.com solr query URL]
q=id:%252Fdocstore%252FzWSW_Extranet%252FDiscovery%2520_788978.000010_%252FThird%2520Party%2520Requests%25
2FWXXXXXX%2520(Immigration)%252F2017.11.21_%2520Jones%2520Nov%252021%2520interview%2520summary(111275000.1)
.DOCX&q.op=OR&indent=true&df=attr_content&mlt.fl=attr_content&useParams=&qt=%2Fmlt
[mlt.adomain.com ucoll URL]
[mlt.adomain.com mltq.php]
searchterm="%2Fdocstore%2FzWSW_Extranet%2FDiscovery%2520_788978.000010_%2FThird%20Party%20Requests%2FWXXXXXX%
20(Immigration)%2F2017.11.21_%20Jones%20Nov%2021%20interview%20summary(111275000.1).DOCX"
```

PHP Code for Query

```
$link = [local solr server] /$collection/mlt/";
$qstr = "q=id:$searchterm" . "&";
$qstr .= "q.op=AND" . "&";
$qstr .= "df=attr_content" . "&";
$qstr .= "mlt.fl=attr_content" . "&";
$qstr .= "wt=json" . "&";
$qstr .= "rows=5";
$arg = $link . "?" . $qstr;
```

Quickly Repurposing an MLT Solr AMI

Save the AMI from the Solr-MLT instance that opens MLT in a new tab, on the udocs database. Launch a new instance with that AMI, again under mlt.adomain.com 3.217.116.238, ssh into it.

Assuming below that 'udocs' is the old collection and 'nydocs' is the new—adapt as needed.

Move u docs to the side, emptying the /var/www/html/docstore dir:

```
cd /var/www/html
mkdir udocs-store
mv docstore/* udocs-store/
```

With the old document files out of the way, Winscp copy NYDOCS working set docs into docstore/. Or, reverse/adapt the above if the files are already saved locally.

Check existing docker images:

```
docker images
```

Remove the old images

```
docker rmi [image id] -f
rm -rf ~/solrdata
mkdir ~/solrdata
sudo chown -R 8983:8983 ~/solrdata
docker run -d -v "$PWD/solrdata:/var/solr" -p 8983:8983 --name u_solr solr solr-precreate ucoll
docker rm [the core it says is still there], then again
docker run -d -v "$PWD/solrdata:/var/solr" -p 8983:8983 --name u_solr solr solr-precreate ucoll
```

Check solr 8983 console, should show ucoll with zero docs.

solrconfig.xml will be in the solrdata directory (a few levels down), owned by 8983:8983 so you will need to sudo Add the following to solrconfig.xml, right above <directoryFactory name= . . .

```
<lib dir="${solr.install.dir:../../..}/contrib/extraction/lib" regex=".*\jar"/>
<lib dir="${solr. install.dir:../../..}/dist/" regex="solr-cell-\d.*\.jar"/>
<requestHandler name="/update/extract"
startup="lazy"
class="solr.extraction.ExtractingRequestHandler" >
<lst name="defaults">
<str name="lowernames">true</str>
<str name="fmap. content">_text_</str>
</lst>
</requestHandler>
<requestHandler name="/mlt" class="solr.MoreLikeThisHandler" />
```

Save the edited solrconfig.xml

Stop and restart solr-docker stop u_solr, docker start u_solr. Check if the page title correct at mlt.adomain.com. If necessary, change jTitle to "DOCUMENT REVIEW INDEX" or some such name, in index.php.

POST the new data: After verifying the new document files are present in docstore/, and that ucoll is there, run this:

```
docker run -v "/var/www/html/docstore:/docstore" --network=host solr post -c ucoll /docstore/ -params "uprefix=attr_&fmap.content=attr content"
```

But note, apostrophes in filenames will not pass properly, need to encode/decode.
Add Limitation by Folder
Query as Entered in Solr Admin Tool:

```
(attr_content:differentiators | | attr_resourcename:differentiators) && attr_resourcename:6-Evidence
```

Solr's Rendition:

```
[mlt.adomain.com solr server]
/solr/ucoll/select?fl=id%20attr_content%20attr_resourcename&indent=true&q.op=AND&q=(attr_content%3Adiffere
ntiators%20%7C%7C%20attr_resourcename%3Adifferentiators)
%20%26%26%20attr_resourcename%3A6-
Evidence&rows=20&useParams=
```

In PHP:

```
$qstr .=
"q=(attr_content:$searchterm%20%7C%7C%20attr_resourcename:
$searchterm)%20%26%26%20attr_resourcename: %22$fo
lder%22" . "&.";
```

Adding Browse Capability by Document Directory
  Put new site at test.adomain.com 54.54.54.78.
  Start with same AMI as mlt.adomain.com.
  Change Title to Document Review (Testing).
  Chop out body of onChange anonymous function, made it a separate named call, which can be called on page load too, with the argument of "*".
  End up with default query of ?????? (instead of *), which better for browsing because it highlights 6-letter words, which is more readable.
  Add paging, using solr 'start' parameter.
  Add Advanced Search help (syntax help) as a popup, add probeinfo.js to flag testing vs production, etc.
Rebuilding the Index with Additional or Replacement Document Files
  ssh into the instance to be updated (e.g., the current "testing" instance, on 44.44.44.241:

```
ssh -i docsite.pem ec2-user@test.adomain.com
```

Stop the running solr process:

```
$ docker stop u_solr
```

Check free storage on the instance, df to make sure there is ample room.

Upload (via winscp) the desired new folders/docs into/var/www/html/docstore.

Check existing docker images:

```
docker images
```

Remove the old images

```
docker rmi [image id] -f
sudo rm -rf ~/solrdata
mkdir ~/solrdata
sudo chown -R 8983:8983 ~/solrdata
docker run -d -v "$PWD/solrdata:/var/solr" -p 8983:8983 --name u_solr solr solr-precreate ucoll
docker rm [the core it says is still there], then again
docker run -d -v "$PWD/solrdata:/var/solr" -p 8983:8983 --name u_solr solr solr-precreate ucoll
docker start u_solr
```

Check solr 8983 console, should show ucoll with zero docs.

```
sudo su
cd ~/solrdata
``` solrconfig.xml will be in the solrdata directory (a few levels down), owned by 8983:8983 so this will need sudo.

Add the following to solrconfig.xml, right above <directoryFactory name= . . .

```
<lib dir="${solr.install.dir:../../..}/contrib/extraction/lib" regex=".*\.jar" />
<lib dir="${solr.install.dir:../../..}/dist/" regex="solr-cell-\d.*\.jar"/>
<requestHandler name="/update/extract"
startup="lazy"
class="solr.extraction.ExtractingRequestHandler" >
<lst name="defaults">
<str name="lowernames">true</str>
<str name="fmap.content">_text_</str>
</lst>
</requestHandler>
<requestHandler name="/mlt" class="solr.MoreLikeThisHandler" />
```

Save the edited solrconfig.xml. Stop and restart solr.

```
docker stop u_solr, docker start u_solr
```

Check that the page title is correct at test.adomain.com. If necessary, change jTitle to "DOCUMENT REVIEW INDEX" or some such name, in index.php. Check that new files are there:

```
ls /var/www/html/docstore
```

POST the new data. After verifying the new document files are present in docstore/, and that ucoll is there, run this:

```
docker run -v "/var/www/html/docstore:/docstore" --network=host solr post -c ucoll /docstore/ -params "uprefix=attr_&fmap.content=attr_content"
```

Instance Rotation

Versioning: udocs Instance n. "udocs Instance [n]" is the current Testing instance (test.adomain.com, currently 54.54.54.78). "udocs Instance [n−1]" is the current Production instance (mlt.adomain.com, currently 44.44.44.241).

To update, in Route 53 DNS, point mlt.adomain.com (the production URL, Instance n−1) at the IP for Instance n and make sure to refresh caches (restart browser and check).

To make a new Testing Instance, take the AMI from Instance N and use it to launch Instance n+1 (whereafter n+1→n, n→n−1).

Make AMI of udocs Instance [N], called "udocs Instance [N]" (e.g., udocs Instance 3). Check in list of AMIs that it has been created.

Launch new instance, called "udocs Instance [N+1]", based on stored AMI, "udocs Instance [N]" (e.g., new instance will be called udocs Instance 4).

Stop the old production udocs instance (e.g., udocs Instance 2).

Disassociate the Elastic IP from old production udocs instance (e.g., udocs Instance 2, 44.44.44.241).

Associate the liberated Elastic IP with the new udocs instance (e.g., udocs instance 4 with 44.44.44.241).

Verify DNS assignments for instances N+1 (testing) (e.g., test.adomain.com) and N (production) (e.g., mlt.adomain.com).

ssh into the new instance (e.g., test.example.us), docker start u_solr and update versioning tags.

Check both the production and test sites.

Stop (or terminate) the old production instance (e.g., udocs Instance 2). Alternately, reassign the Elastic IPs and keep the existing DNS assignments.

Integrating Git

Installing Git and Fixing Permissions

```
sudo yum update -y
sudo yum install git -y
``` cd/var/www/html, but you will likely get Permission denied if you try git init in it, as it. Note, this directory itself is probably still owned by root, even if you followed the AWS directions in setting it up. (The generic instructions change the ownership of everything BELOW html, but we need to change html itself so git can write to it.) So,

```
cd /var/www
sudo chown -R ec2-user:apache html
```

Then,

```
cd /var/www/html
git init
git commit -m "initial commit"
git remote add origin [github.com someuser's document-review.git]
git branch -M main
git push -u origin main
```

GitHub Credentials (Redacted).

```
PAT: [token]
```

Add gh so as not to have to retype the entire PAT every time.

```
sudo yum-config-manager --add-repo [cli.github.com gh-cli.repo]
sudo yum install gh
gh auth login
```

Workflow—Edit e.g. index.php in place on the testing server, e.g., to fix that a document with the character # in its filename was not displaying in the iFrame (giving a 404 Not found error instead)—file name incorrectly encoded. Save edited file

```
$ git add index.php
$ git commit -m "Fixed that '#' in the path wasn't working"
[main 0cc9a41] Fixed that '#' in the path wasn't working
1 file changed, 14 insertions (+), 4 deletions(-)
$ git push -u origin main
Enumerating objects: 5, done.
Counting objects: 100% (5/5), done.
Compressing objects: 100% (3/3), done.
Writing objects: 100% (3/3), 795 bytes | 795.00 KiB/s, done.
Total 3 (delta 2), reused 0 (delta 0), pack-reused 0
remote: Resolving deltas: 100% (2/2), completed with 2 local objects.
```

Save it to [github.com someuser's document-review.git]

```
a49ae5f..0cc9a41  main -> main
``` branch 'main' is then set up to track 'origin/main'.

FIG. 4 reflects what was then shown on GitHub.

The following is a representative example of the application source code. Note that the system is implemented on two "servers": (1) base_client.adomain.com and (2) base_server.adomain.com. The former contains the client-side functionality that will be downloaded to each user's browser, and also manages calls that will relay to base_server. The latter has the document repositories and runs the solr database. There are aliases of base_server for each document collection, and requests are routed to the proper repo and solr collection based on the subdomain being accessed. Thus, multiple document sets and corresponding solr collections can live on the same base_server, and be differentiated at run time based by the DNS name by which they are called.

Code Indexes and Listings:
Client Main Code (from "Client" Server):

```
ron@localhost:/var/wwwfree
|__ somecollection.puredocs.us
|  |__ dbui.css-> ../html/dbui.css
|  |__ favicon.ico-> ../html/favicon.ico
|  |__ index.php-> /var/www/html index.php
|  |__ lib -> ../html/lib
|  |__ manifest.js
|  |__ mlt.php-> ../html/mlt.php
|__ html
|  |__ dbui.css
|  |__ favicon.ico
|  |__ index.html
|  |__ index.php
|  |__ lib
|     |__ js
|        |__jquery-latest.js
|        |__jquery.layout-latest.js
|        |__jquery-ui-latest.js
|  |__ mlt.php
|__ msnbc.puredocs.us
   |__ dbui.css-> ../html/dbui.css
   |__ favicon.ico> ../html/favicon.ico
   |__ index.php-> /var/www/html/index.php
   |__ lib-> ../html/lib
   |__ manifest.js
   |__ mlt.php-> ../html/mlt.php
```

Apache config file for client server: base_client.conf (in the Computer Program Appendix).

index.html for client server: index.html (in the Computer Program Appendix under heading "base_client.conf").

index.php for client server: index.php (in the Computer Program Appendix under heading "index.php").

Stylesheet: dbui.css (in the Computer Program Appendix under heading "dbui.css").

Manifest.js (differs for each collection): manifest.js (in the Computer Program Appendix under heading "manifest.js").

Server-side code: base_server.conf (in the Computer Program Appendix under heading "base_server.conf").

Server directory structure: tree.txt (in the Computer Program Appendix under heading "tree.txt").

Server index.html: index(2).html (in the Computer Program Appendix under heading "index(2).html" (but in original location as "index.html").

doCount.php (in the Computer Program Appendix under heading "doCount.php").

repodir.php: repodir.php (in the Computer Program Appendix under heading "repodir.php").

remoteq.php: remoteq.php (in the Computer Program Appendix under heading "remoteq.php").

mltq.php: mltq.php (in the Computer Program Appendix under heading "mltq.php").

summary_inserter.php: summary_inserter.php (in the Computer Program Appendix under heading "inserter.php").

sorlTest.php: solrTest.php (in the Computer Program Appendix under heading "sorlTest.php").

Although the foregoing description addresses certain embodiments in detail, as examples of possible implementation of the invented subject matter, it should be understood that the claims appended are not limited by the disclosures of such embodiments. Persons of ordinary skill in the art will recognize that certain features may be added, changed, or omitted without departing from the spirit and scope of the invention, as defined by the claims.

The invention claimed is:
1. A method for operating and rotating test and production status of respective complete code bases for a first and at least a second version of a web server application, the first version of the web server application being implemented by a first complete code base and the at least second version of the web server application being implemented by an at least second code base, comprising:

running the first code base on a first machine instance having a first Internet Protocol (IP) address and associated by a first uniform resource locator (URL) with a first subdomain of a domain, said first URL being designated as a test URL;

running the at least second code base on an at least second machine instance having a second IP address and associated by a second URL with an at least second subdomain of the domain, said at least second URL being designated as a production URL relative to the first URL;

wherein the first machine instance and the at least second machine instance are each accessible to clients over the public internet, and the first IP address and the at least second IP address are distinct from each other;

wherein the first and at least second versions of the web server application each provide user client access protected by secure sockets layer/transport layer security (ssl/tls);

provisioning each of said web server application versions with a wildcard server ssl/tls certificate, the wildcard server ssl/tls certificate being usable for a plurality of subdomains of the domain including the first subdomain and the at least second subdomain, the provisioned web server application versions comprising the respective first and at least second machine instances running on a first web server and an at least second web server;

creating a machine image that saves, as of the time of such creating, the operating state of the first machine instance, the operating state of the first machine instance including the first code base, program counter and register contents, stack and memory contents, and storing the machine image on non-transitory machine-readable media to become a stored machine image;

reassociating the first machine instance with the at least second sub-domain and at least second URL; and launching a new machine instance based on the stored machine image and associating the new machine instance with the first subdomain and the first URL;

wherein said web server applications continue to use the wildcard ssl/tls certificate to make ssl/tls connections to their respective clients, client access to the web server application for testing remains and continues to be at the first URL, and client access to the web server application for production remains and continues to be at the at least second URL, without the need to reconfigure or provide a new ssl/tls certificate to any of the clients or web servers and without requiring any client to vary any parameter or format of its requests to the web server application, other than directing the target address of the request to the test URL or production URL as desired, in order to access test or production versions of the web server application.

2. The method of claim 1 wherein in said associating and reassociating the first machine instance and the at least second machine instance with the respective subdomains, the IP addresses of the machine instances are rotated among the servers.

3. The method of claim 1 wherein in said associating and reassociating the first machine instance and the new machine instance with the respective subdomains, the IP addresses associated with the servers are rotated among the subdomains.

4. The method of claim 1 further comprising rotating among a plurality of production web servers all but one of which are regarded as staging servers, which form a progression as to degree of testing of the versions of the web server application, and in which a plurality of reassociations as recited in claim 1 are chained down the progression of the servers from a testing instance, to successively more tested staging instances, to a production instance, starting with reassociating the testing web server with the subdomain of the least tested staging web server.

5. The method of claim 1, wherein each web server depends on at least one supporting web server, further comprising provisioning the at least one supporting web server with a reverse proxy configured with virtualhost headers to accept cross-origin requests from the first server and at the least one second server.

6. The method of claim 5, wherein each said server comprises a level in a hierarchy of servers and wherein changes to data may be made by users in the lowest (production) level server, and said changes to the data of the supporting server are mirrored to the corresponding data of the supporting servers at each of the levels upward from the production server in the hierarchy.

7. The method of claim 6, wherein said mirroring is performed at all levels as said changes occur on the production server.

8. The method of claim 6, wherein said mirroring at each said level is performed on a batch basis with accumulated data changes in production, at least prior to server rotation at that level.

9. The method of claim 1 wherein at least one of the servers is implemented as a virtual machine instance.

10. The method of claim 9, further comprising varying the provisioning or resources for launching at least one of the instances from the resources or provisioning of the other instances.

11. The method of claim 1, wherein each server operates to detect its own test, staging, or production status.

12. The method of claim 1, wherein the instances are run in a common operational environment and the association of instances with subdomains is automated by scripting in the environment of the instances.

13. A system for providing a rotating test-staging-production development and operating environment for a web-based internet application comprising:

a virtual computing environment (VCE) connected to the public internet, a set of virtual machines (VMs), running as member VMs of the set, in the VCE, comprising a first VM running an exclusively testing version of the internet application, zero or more VMs each running a staging version of the internet application, each for use partially for testing and to handle a portion of production, a VM running a full production version of the internet application, for use substantially entirely for production, wherein the exclusively testing version, staging versions (if any), and full production version together represent a progression of versions of the internet application, from full testing to full production, the progression being in an order, the order being based on the respective cumulative run time of the internet application versions being run in the member VMs in a status of having been wholly or partially under test, further wherein each of the member VMs is associated with a public internet URL within a domain, the URLs being selected from a set of URLs including the URL for the domain and the URLs for the domain's subdomains, further wherein each version of the internet application run by the respective member VMs is configured for access restricted to secure sockets layer/transport layer security (ssl/tls) and provisioned with an ssl/tls server certificate for a wildcard URL for said domain and its subdomains, a store for VM images, instructions stored in a non-transitory tangible media accessible to and executable by a processor in the VCE, the instructions implementing commands to save, in the store for VM images, an image of the VM running the exclusively testing version of the internet application as a stored server image, successively reassign the URLs of the VM instances running the exclusively testing, staging, and full production versions of the internet application, in reverse order from said order, up to but not including reassignment of the URL of the exclusively testing version, and launch a new VM based on the stored server image, to become a new exclusively testing version of the internet application, and assign to such new exclusively testing version the URL of the VM that ran the prior exclusively testing version of the internet application.

\* \* \* \* \*